(12) United States Patent
Wang et al.

(10) Patent No.: US 12,457,924 B2
(45) Date of Patent: Nov. 4, 2025

(54) SMART MOWING SYSTEM

(71) Applicant: Nanjing Chervon Industry Co., Ltd., Nanjing (CN)

(72) Inventors: Hongwei Wang, Nanjing (CN); Dezhong Yang, Nanjing (CN); Qing Gao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 867 days.

(21) Appl. No.: 17/726,955

(22) Filed: Apr. 22, 2022

(65) Prior Publication Data

US 2022/0240444 A1 Aug. 4, 2022

Related U.S. Application Data

(63) Continuation of application No. PCT/CN2020/128717, filed on Nov. 13, 2020.

(30) Foreign Application Priority Data

Nov. 15, 2019 (CN) .......................... 201911120236.8
Dec. 26, 2019 (CN) .......................... 201911362084.2

(Continued)

(51) Int. Cl.
*A01D 34/00* (2006.01)
*G05D 1/00* (2024.01)
*A01D 101/00* (2006.01)

(52) U.S. Cl.
CPC .......... *A01D 34/008* (2013.01); *G05D 1/0212* (2013.01); *G05D 1/0259* (2013.01); *G05D 1/0891* (2013.01); *A01D 2101/00* (2013.01)

(58) Field of Classification Search
CPC ............. A01D 34/008; A01D 2101/00; G05D 1/0212; G05D 1/0259; G05D 1/0891
See application file for complete search history.

(56) References Cited

U.S. PATENT DOCUMENTS

| | | | |
|---|---|---|---|
| 6,300,737 B1* | 10/2001 | Bergvall .............. | A01D 34/008 |
| | | | 318/587 |
| 2016/0285288 A1* | 9/2016 | Yamamura ........... | G05D 1/0265 |
| 2020/0278691 A1* | 9/2020 | Dalfra .................. | G05D 1/0265 |

FOREIGN PATENT DOCUMENTS

| | | |
|---|---|---|
| CN | 102759924 A | 10/2012 |
| CN | 102890505 A | 1/2013 |

(Continued)

OTHER PUBLICATIONS

EPO, extended European Search Report issued on European patent application No. 20887633.4, dated Oct. 4, 2022, 9 pages.

(Continued)

*Primary Examiner* — Scott A Browne
*Assistant Examiner* — Terry C Buse
(74) *Attorney, Agent, or Firm* — Greenberg Traurig, LLP

(57) ABSTRACT

A smart mowing system includes a boundary line, a signal transmitting unit, and a smart mower. The boundary line is configured to plan a working area. The signal transmitting unit is configured to generate a boundary signal to the boundary line. The smart mower includes a first signal receiving module, a second signal receiving module, and a control module. The second signal receiving module is a preset distance away from the first signal receiving module. The control module is configured to determine whether the first signal receiving module is located inside the boundary line, to determine whether the second signal receiving module is located inside the boundary line, and to control the smart mower to walk along the boundary line when the first signal receiving module or the second signal receiving module is located outside the boundary line.

19 Claims, 19 Drawing Sheets

(30) Foreign Application Priority Data

Dec. 26, 2019 (CN) .......................... 201911362095.0
Dec. 26, 2019 (CN) .......................... 201911362972.4
Dec. 26, 2019 (CN) .......................... 201911362973.9

(56) References Cited

FOREIGN PATENT DOCUMENTS

| | | |
|---|---|---|
| CN | 103197672 A | 7/2013 |
| CN | 103488172 A | 1/2014 |
| CN | 103838238 A | 6/2014 |
| CN | 105467982 A | 4/2016 |
| CN | 108490945 A | 9/2018 |
| CN | 108781704 A | 11/2018 |
| CN | 109739242 A | 5/2019 |
| DE | 102009001900 | 4/2010 |
| DE | 102009001900 A1 | 4/2010 |
| EP | 2703925 A1 | 3/2014 |
| EP | 2901840 A1 | 8/2015 |
| JP | 2017182634 A | 10/2017 |
| WO | 2003104908 A1 | 12/2003 |

OTHER PUBLICATIONS

ISA/CN, English translation of Written Opinion issued on PCT application No. PCT/CN2020/128717, dated Feb. 19, 2021, 3 pages.

ISA/CN, English translation of Int. Search Report issued on PCT application number PCT/CN2020/128717, dated Feb. 19, 2021, 2 pages.

ISA/CN, Written Opinion issued on PCT application number PCT/CN2020/128717, dated Feb. 19, 2021, 3 pages.

ISA/CN, English translation of Written Opinion issued on PCT application number PCT/CN2020/128717, dated Feb. 19, 2021, 3 pages.

* cited by examiner

SMART MOWING SYSTEM

RELATED APPLICATION INFORMATION

This application is a continuation of International Application Number PCT/CN2020/128717, filed on Nov. 13, 2020, through which this application also claims the benefit under 35 U.S.C. § 119(a) of Chinese Patent Application No. 201911120236.8, filed on Nov. 15, 2019, Chinese Patent Application No. 201911362973.9, filed on Dec. 26, 2019, Chinese Patent Application No. 201911362972.4, filed on Dec. 26, 2019, Chinese Patent Application No. 201911362084.2, filed on Dec. 26, 2019, and Chinese Patent Application No. 201911362095.0, filed on Dec. 26, 2019, all of which are incorporated herein by reference in their entirety.

BACKGROUND

Generally, an outdoor gardening cutting tool such as a mower is provided with an operation handle for pushing. The operation handle is provided with a switch box and a control mechanism at a position adjacent to a holding portion to facilitate operation and control by an operator. The mower moves on the ground and performs a cutting operation by relying on a thrust applied by the operator to the operation handle. The operator operates such a push-type mower with a very high labor intensity. With the continuous development of artificial intelligence, self-walking smart mowers have been developed. Since smart mowers can automatically walk and perform related tasks set in advance without manual operation and intervention, manpower and material resources are greatly saved, thereby bringing convenience to the operator.

The advent of smart mowers has brought great convenience to users, releasing users from heavy gardening care work. However, at present, a smart mower can sense only obstacles or boundaries encountered, but cannot know the original walking direction, resulting in smart random collisions in a narrow area. As a result, the smart mower needs to take a long time to leave the area and may even be unable to leave.

SUMMARY

An example provides a smart mowing system. The smart mowing system includes a boundary line, a signal transmitting unit and a smart mower. The boundary line is configured to plan a working area of the smart mower. The signal transmitting unit is electrically connected to the boundary line and configured to generate a boundary signal and transmit the boundary signal to the boundary line. A magnetic field is generated when the boundary signal flows through the boundary line. The smart mower includes a first signal receiving module, a second signal receiving module and a control module. The first signal receiving module is configured to generate a first boundary line induction signal by inducing a change of the magnetic field generated by the boundary signal. The second signal receiving module is configured to generate a second boundary line induction signal by inducing a change of the magnetic field generated by the boundary signal. The second signal receiving module is a preset distance away from the first signal receiving module. The control module is configured to receive the first boundary line induction signal and the second boundary line induction signal, and according to at least the first boundary line induction signal, to determine whether the first signal receiving module is located inside the boundary line; according to at least the second boundary line induction signal, to determine whether the second signal receiving module is located inside the boundary line; and when at least one of the first signal receiving module or the second signal receiving module is located outside the boundary line, to control the smart mower to walk basically along the boundary line.

In one example, the boundary signal includes a transmit signal segment and a vacant signal segment which appear alternately. Moreover, the transmit signal segment is a first sine wave of a first phase.

In one example, the boundary signal includes a transmit signal segment and an inhibit signal segment which occur alternately. Moreover, the transmit signal segment is a first sine wave of a first phase; the inhibit signal segment is a second sine wave of a second phase; and the second phase is opposite to the first phase.

In one example, a voltage peak value VH1 and a voltage valley value VL1 of the first boundary line induction signal in the current period and a voltage peak value VH2 and a voltage valley value VL2 of the first boundary line induction signal in the previous period are obtained according to at least the first boundary line induction signal to determine whether the first signal receiving module is located inside the boundary line.

In one example, the first boundary line induction signal includes a first signal segment and a second signal segment. In response to first acquiring that the voltage peak value VH1 is less than the voltage peak value VH2 when the first boundary line induction signal is the first signal segment, the first signal receiving module is located in the working area.

In one example, the first boundary line induction signal includes a first signal segment and a second signal segment. In response to first acquiring that the voltage peak value VH1 is greater than the voltage peak value VH2 when the first boundary line induction signal is the second signal segment, the first signal receiving module is located in the working area.

In one example, the control module is configured to acquire the phase of the first boundary line induction signal; and if the value range of the phase of the first boundary line induction signal is greater than or equal to −90° and less than 90°, determine that the first signal receiving module is located in the working area.

In one example, the control module is configured to acquire the phase of the first boundary line induction signal by multiplying the first boundary line induction signal by a first preset function; and if the value range of the phase of the first boundary line induction signal is greater than or equal to −90° and less than 90°, determine that the first signal receiving module is located in the working area.

In one example, a voltage peak value SH2 and a voltage valley value SL2 of the second boundary line induction signal in the current period and a voltage peak value SH1 and a voltage valley value SL1 of the first boundary line induction signal in the previous period are obtained according to at least the second boundary line induction signal to determine whether the second signal receiving module is located inside the boundary line.

In one example, the second boundary line induction signal includes a first signal segment and a second signal segment. In response to first acquiring that the voltage peak value SH1 is less than the voltage peak value SH2 when the second boundary line induction signal is the first signal segment, the second signal receiving module is located in the working area.

In one example, the second boundary line induction signal includes a first signal segment and a second signal segment. In response to first acquiring that the voltage peak value SH1 is greater than the voltage peak value SH2 when the second boundary line induction signal is the second signal segment, the first signal receiving module is located in the working area.

In one example, the control module is configured to acquire the phase of the second boundary line induction signal; and if the value range of the phase of the second boundary line induction signal is greater than or equal to −90° and less than 90°, determine that the second signal receiving module is located in the working area.

In one example, the control module is configured to acquire the phase of the second boundary line induction signal by multiplying the second boundary line induction signal by a first preset function; and if the value range of the phase of the second boundary line induction signal is greater than or equal to −90° and less than 90°, determine that the second signal receiving module is located in the working area.

In one example, a voltage peak value VH1 and a voltage valley value VL1 of the first boundary line induction signal in the current period and a voltage peak value VH2 and a voltage valley value VL2 of the first boundary line induction signal in the previous period are obtained according to at least the first boundary line induction signal to determine whether the first signal receiving module is located inside the boundary line.

In one example, the first boundary line induction signal includes a first signal segment and a second signal segment. In response to first acquiring that the voltage peak value VH1 is greater than the voltage peak value VH2 when the first boundary line induction signal is the first signal segment, the first signal receiving module is located in the working area.

In one example, the first boundary line induction signal includes a first signal segment and a second signal segment. In response to first acquiring that the voltage peak value VH1 is less than the voltage peak value VH2 when the first boundary line induction signal is the second signal segment, the first signal receiving module is located in the working area.

In one example, a voltage peak value SH2 and a voltage valley value SL2 of the second boundary line induction signal in the current period and a voltage peak value SH1 and a voltage valley value SL1 of the first boundary line induction signal in the previous period are obtained according to at least the second boundary line induction signal to determine whether the second signal receiving module is located inside the boundary line.

In one example, the second boundary line induction signal includes a first signal segment and a second signal segment. In response to first acquiring that the voltage peak value SH1 is greater than the voltage peak value SH2 when the second boundary line induction signal is the first signal segment, the second signal receiving module is located in the working area.

In one example, the second boundary line induction signal includes a first signal segment and a second signal segment. In response to first acquiring that the voltage peak value SH1 is less than the voltage peak value SH2 when the second boundary line induction signal is the second signal segment, the first signal receiving module is located in the working area.

In one example, the control module is configured to when at least one of the first signal receiving module or the second signal receiving module is located outside the boundary line, acquire the attitude of the smart mower relative to the boundary line and control the smart mower to basically walk along the boundary line according to the attitude of the smart mower relative to the boundary line.

In one example, the attitude of the smart mower relative to the boundary line includes the included angle between the heading direction of the smart mower and the boundary line and at least one of a first vertical distance Y1 between the first signal receiving module and the boundary line or a second vertical distance Y2 between the second signal receiving module and the boundary line.

In one example, the control module is configured to calculate the first vertical distance between the first signal receiving module and the boundary line based on the amplitude of the first boundary line induction signal; calculate the second vertical distance between the second signal receiving module and the boundary line based on the amplitude of the second boundary line induction signal; and calculate the included angle between the heading direction of the smart mower and the boundary line based on the first vertical distance Y1, the second vertical distance Y2 and the preset distance D.

In one example, the intersection of a straight line in which the first signal receiving module and the second signal receiving module are located and the boundary line is defined as a first intersection. Moreover, the control module is further configured to calculate a first distance between the first signal receiving module and the first intersection based on the first vertical distance and the included angle; to calculate a second distance between the second signal receiving module and the first intersection based on the second vertical distance and the included angle; and to control the smart mower to walk basically along the boundary line based on the first distance and the second distance.

An example provides a smart mowing system. The smart mowing system includes a boundary line, a signal transmitting unit and a smart mower. The boundary line includes a first boundary line and a second boundary line adjacent to the first boundary line. A walk passage is defined between the first boundary line and the second boundary line. The signal transmitting unit is electrically connected to the boundary line and configured to generate a boundary signal and transmit the boundary signal to the boundary line. A magnetic field is generated when the boundary signal flows through the boundary line. The smart mower includes a first signal receiving module, a second signal receiving module and a control module. The first signal receiving module is configured to generate a first boundary line induction signal by inducing a change of the magnetic field generated by the boundary signal. The second signal receiving module is configured to generate a second boundary line induction signal by inducing a change of the magnetic field generated by the boundary signal. The second signal receiving module is a preset distance away from the first signal receiving module. The control module is configured to receive the first boundary line induction signal and the second boundary line induction signal, and according to at least the first boundary line induction signal, to determine whether the first signal receiving module is located inside the boundary line; according to at least the second boundary line induction signal, to determine whether the second signal receiving module is located inside the boundary line; and when at least one of the first signal receiving module or the second signal receiving module is located inside the boundary line, to control the smart mower to pass through the walk passage.

DETAILED DESCRIPTION

Figure 1:
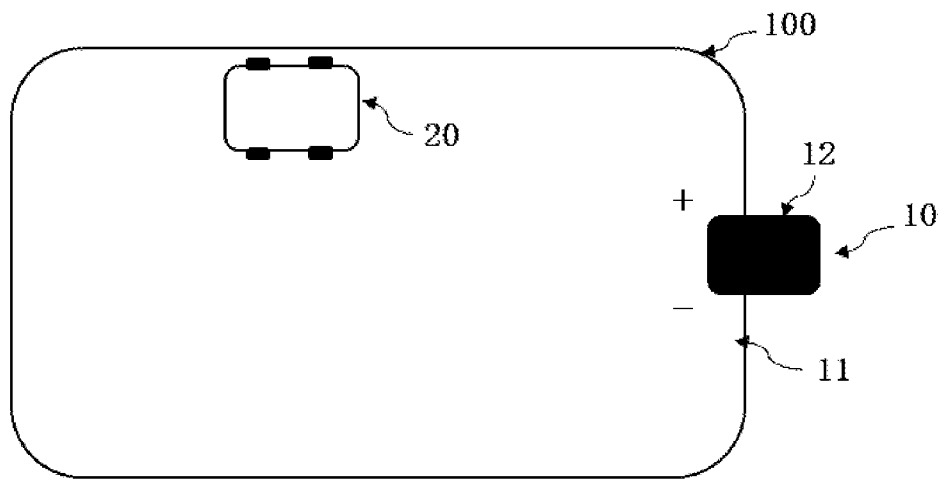
FIG. 1 is a diagram of a smart mowing system.

A smart mowing system 100 of one example shown in FIG. 1 includes a boundary module 10 and a smart mower 20. The boundary module 10 includes a boundary line 11 and a signal transmitting unit 12. The boundary line 11 is configured to plan the working area of the smart mower 20. The area located inside the boundary line 11 is a working area, and the area located outside the boundary line 11 is a non-working area. The boundary line 11 is disposed on the ground. The signal transmitting unit 12 is electrically connected to the boundary line 11. The signal transmitting unit 12 generates a boundary signal BS and transmits the BS to the boundary line 11. A magnetic field is generated when the boundary signal BS flows through the boundary line 11. In one example, the boundary signal BS may be a current signal. In some examples, the signal transmitting unit 12 periodically provides an alternating current signal for the boundary line 11. An alternating magnetic field is generated when the current signal flows through the boundary line 11. In one example, the signal transmitting unit 12 may be a charging pile. The charging pile can periodically provide an alternating current signal for the boundary line 11, and the charging pile can also charge the smart mower.

Figure 2:
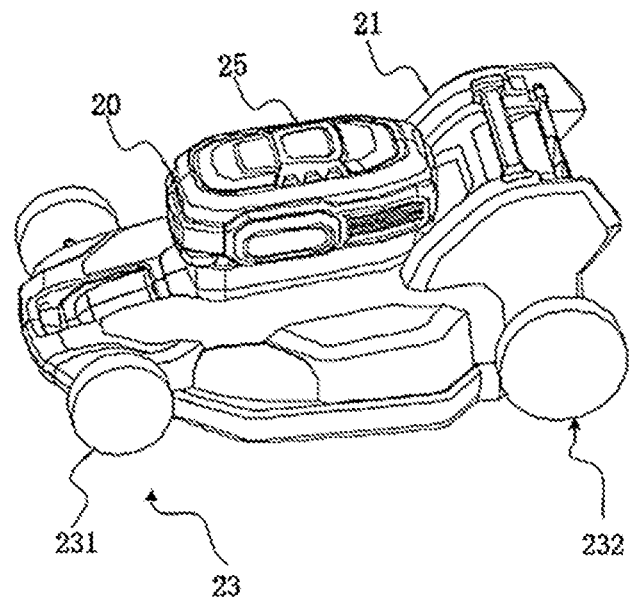
FIG. 2 is a view illustrating the structure of a smart mower in the smart mowing system shown in FIG. 1.

Referring to FIG. 2, the smart mower 20 includes a cutting blade, a main body 21, at least one wheel 23, a drive module 24, a power module 25 and a power supply circuit. The cutting blade is used for cutting grass or vegetation. The main body 21 is used for supporting the cutting blade. The at least one wheel 23 is supported by the main body 21 and can rotate. The drive module 24 is connected to the at least one wheel 23 and provides a driving force to drive the at least one wheel 23. The power module 25 provides electrical energy for the smart mower 20. The power supply circuit is electrically connected to the power module 25 and a motor so that the electrical energy output from the power module 25 is provided for the motor so as to drive the at least one wheel 23 to walk. The smart mower 20 may select a fully automatic mowing mode or may add a manual mowing mode. That is, a user manually controls the smart mower 20 to operate.

Exemplarily, the drive module 24 includes a drive motor and a cutting motor. The drive motor is configured to provide torque for the at least one wheel, thereby driving the smart mower 20 to move. The cutting motor is configured to provide torque for the cutting blade 22, thereby driving the cutting blade 22 to rotate for a mowing operation.

The drive module 24 may include only one motor. The motor drives the wheel and the cutting blade 22 simultaneously. The structural elements of the smart mower 20 may be changed as long as the mowing performance of the smart mower 20 can be achieved.

The smart mower 20 further includes a signal receiving module 26 and a control module 27. The signal receiving module 26 is used for inducing the magnetic field and according to the change of the induced magnetic field, generating a boundary line induction signal MS. The control module 27 is configured to receive the boundary line induction signal MS and according to the boundary line induction signal MS, control the smart mower 20 to walk in the working area. The control module is configured to be able to determine whether the smart mower 20 is in the working area inside the boundary line 11 according to the boundary line induction signal MS.

The signal receiving module 26 can convert the magnetic field into a corresponding electrical signal. In some examples, the signal receiving module 26 includes inductance. The inductance induces the magnetic field and generates a corresponding electromotive force. Thus, the magnetic field is converted into a boundary line induction signal, and the boundary line induction signal is transmitted to the control module 27. In some other examples, the signal receiving module 26 includes a magnetic field detection sensor. The magnetic field detection sensor can detect an alternating magnetic field and convert the alternating magnetic field into an electrical signal to output.

In some examples, the signal transmitting unit 12 provides an alternating current signal for the boundary line 11. The alternating current flows through the boundary line 11 to generate a magnetic field. The signal receiving module 26 converts the magnetic field into a corresponding boundary line induction signal MS and transmits the boundary line induction signal MS to the control module 27.

Figure 3:
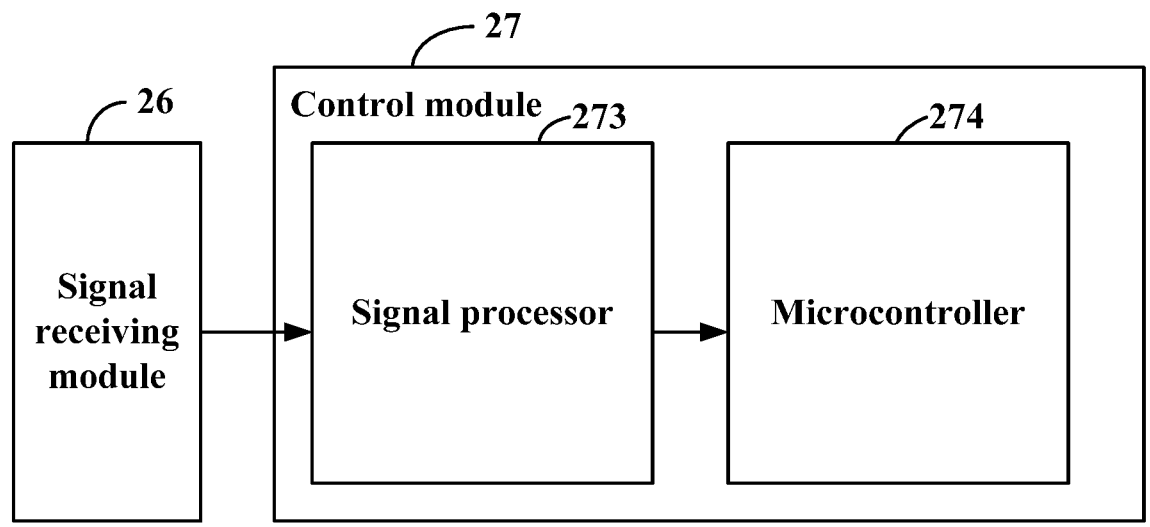
FIG. 3 is a circuit block diagram of the smart mowing system shown in FIG. 1.

The control module is configured to acquire the phase of a boundary line induction signal. if the value range of the phase of the boundary line induction signal is greater than or equal to −90° and less than 90°, it is determined that the first signal receiving module is located in the working area. Referring to FIG. 3, the control module 27 includes a signal processor 273 and a microcontroller 274. The signal processor 273 receives the boundary line induction signal MS and transmits the boundary line induction signal MS to the microcontroller 274. The microcontroller 274 receives the boundary line induction signal MS and calculates the amplitude and phase of the boundary line induction signal MS, thereby determining the distance between the smart mower 20 and the boundary line 11 and determining whether the smart mower 20 is in the working area inside the boundary line 11 or in the non-working area outside the boundary line 11, and thus controlling the walking direction of the smart mower 20. After receiving the boundary line induction signal MS, the microcontroller 274 can perform a multiply-accumulate operation with the waveform function of the boundary line induction signal MS and the sine function or cosine function to calculate the amplitude and phase of the boundary line induction signal MS. Thus, the distance between the smart mower 20 and the boundary line 11 and whether the mower is located inside the boundary line 11 are determined. According to the determination result, the walking direction of the smart mower 20 is controlled.

Figure 4A:
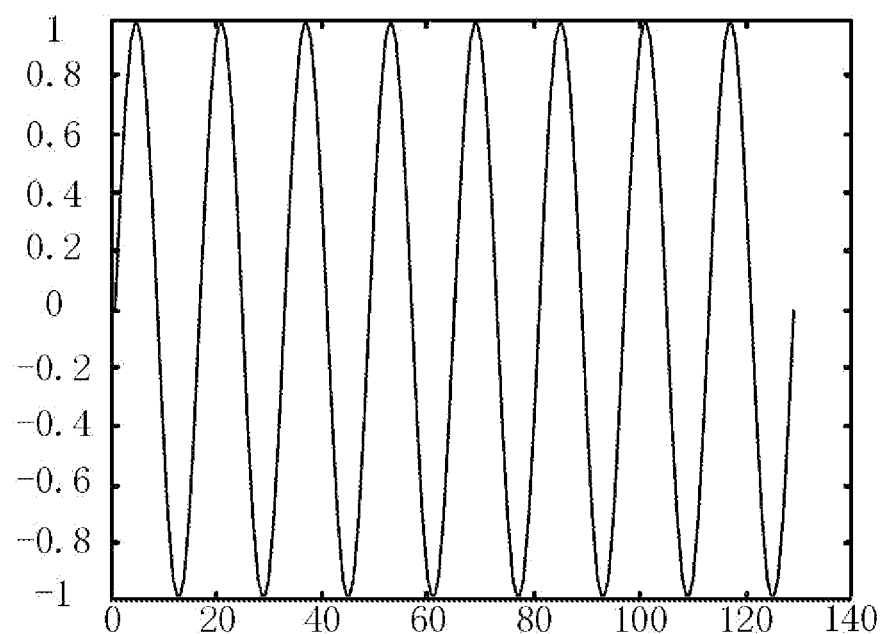
FIG. 4A is a waveform diagram of a boundary line induction signal according to one example.
Figure 4B:
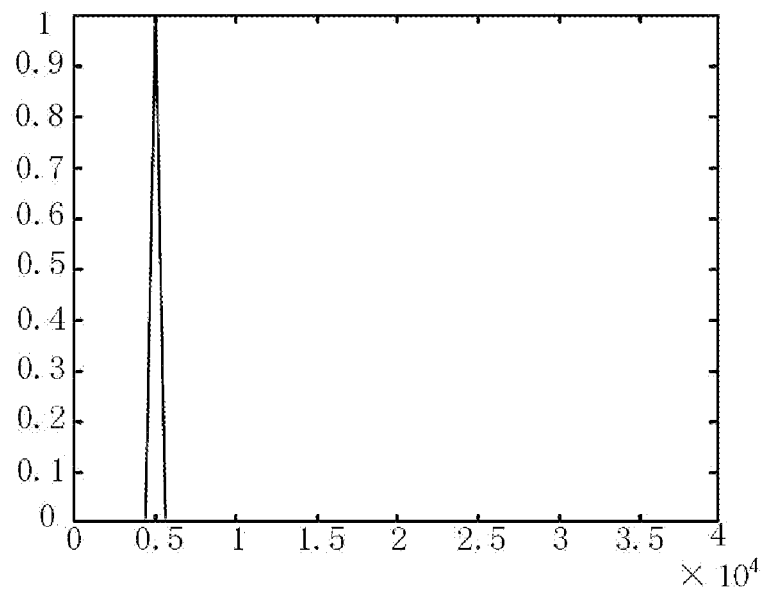
FIG. 4B is an amplitude-frequency graph obtained after the waveform of the boundary line induction signal shown in FIG. 4A is calculated by a control module.
Figure 4C:
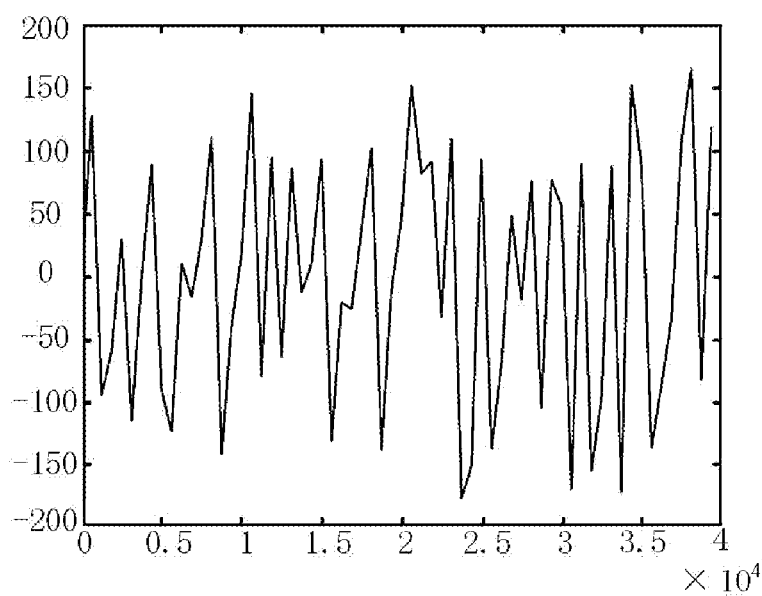
FIG. 4C is a phase-frequency graph obtained after the waveform of the boundary line induction signal shown in FIG. 4A is calculated by a control module.

In one example, the control module is configured to acquire the phase of the boundary line induction signal by multiplying the boundary line induction signal by a first preset function. If the value range of the phase of the boundary line induction signal is greater than or equal to −90° and less than 90°, it is proved that the boundary line induction signal MS is a sine wave signal, and the phase of the boundary line induction signal MS is consistent with the phase of the boundary signal BS. Then it is determined that the signal receiving module is located in the working area, that is, the smart mower is located inside the boundary line. When the value range of the phase after performing a multiply-accumulate operation with the boundary line induction signal and a second preset function is greater than or equal to −90° and less than 90°, the phase of the boundary line induction signal MS and the phase of the boundary signal BS are opposite. It is proved that the mower is located outside the boundary line. Exemplarily, the first preset function is a cosine function, and the second preset function is a sine function. Referring to FIG. 4, FIG. 4A is the boundary line induction signal MS. In this example, the frequency of the boundary line induction signal MS is 5 kHz. The waveform of the boundary line induction signal is performed a multiply-accumulate operation with the sine function or the cosine function to obtain an amplitude-frequency graph shown in FIG. 4B and a phase-frequency graph shown in FIG. 4C. As shown in FIG. 4B and FIG. 4C, when the frequency is 5 kHz, the amplitude value corresponds to 1. The value range of the phase after performing a multiply-accumulate operation with the boundary line induction signal and the cosine function is −90°, it is proved that the signal waveform of the boundary line induction signal MS is a sine wave signal and is consistent with the signal waveform of the boundary signal BS. Then it is determined that the mower is located inside the boundary line. Therefore, the microcontroller 274 can determine the distance between the smart mower 20 and the boundary line 11 and whether the mower is located inside the boundary line 11 according to the amplitude and phase results, thereby sending a control signal to a control unit to control the walking direction of the smart mower 20. The frequency of the boundary line induction signal is not limited to 5 kHz.

Figure 5:
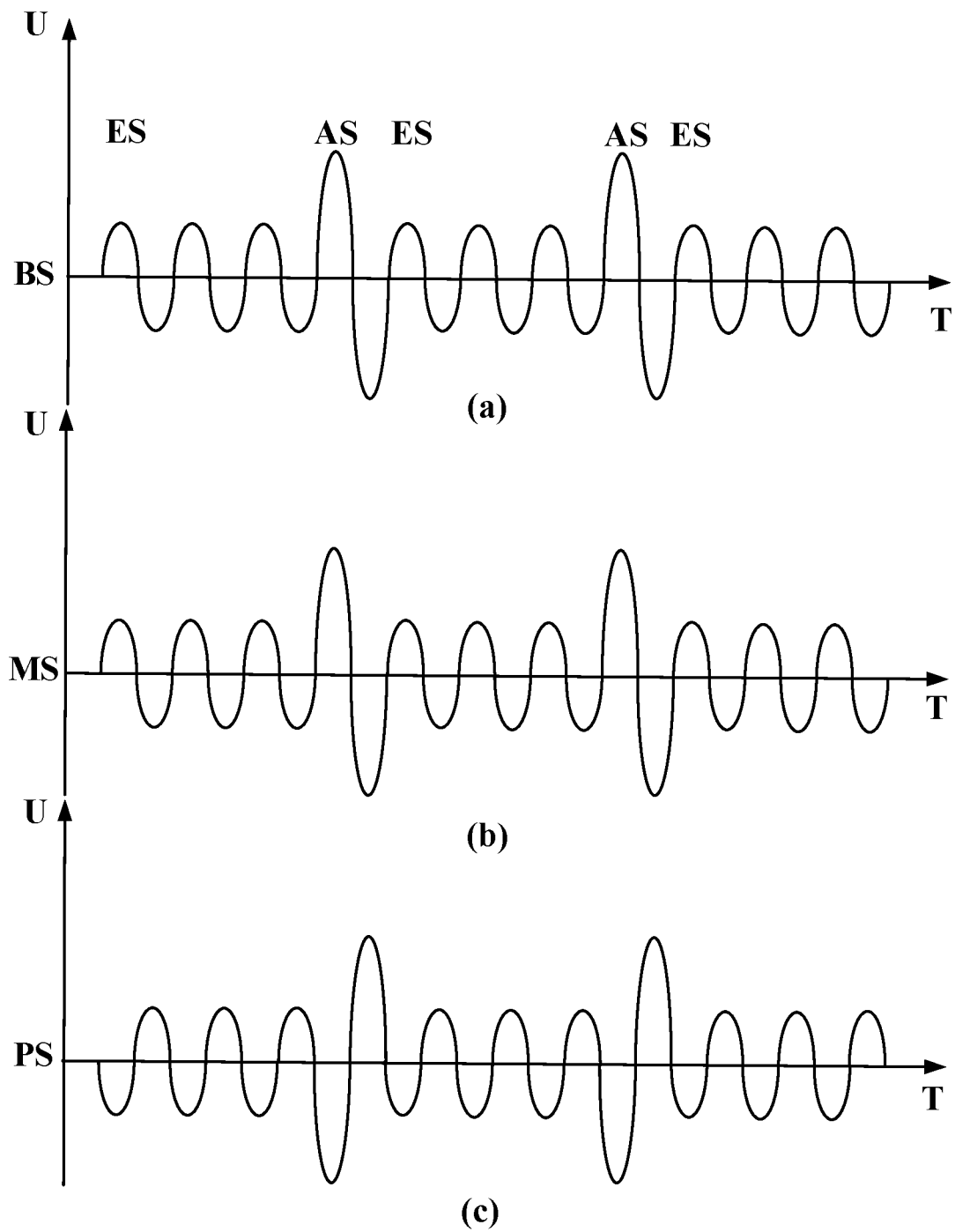
FIG. 5 is a waveform diagram (a) of a boundary signal of the smart mowing system shown in FIG. 1, a waveform diagram (b) of a boundary line induction signal of the smart mower inside the boundary line and, a waveform diagram (c) of a boundary line induction signal of the smart mower outside the boundary line.

In some examples, the boundary signal BS is a periodic signal in which a transmit signal segment ES and an auxiliary signal segment AS occur alternately. FIG. 5 shows a waveform diagram of the boundary signal of the smart mowing system according to the example shown in FIG. 1. The transmit signal segment ES is a sine wave signal. The signal transmitting unit 12 transmits a sine wave signal of predetermined duration at fixed intervals. The auxiliary signal segment AS is a signal with at least one of amplitude, phase or frequency different from the transmission signal AS. Referring to FIG. 5A, the amplitude of the auxiliary signal segment AS is different from the amplitude of the transmit signal segment ES. The signal receiving module 26 detects the boundary signal BS and converts the boundary signal BS into the boundary line induction signal MS to transmit the boundary line induction signal MS to the control module 27. The signal receiving module also detects the abrupt change of the boundary signal BS corresponding to the auxiliary signal segment AS. The signal processor 273 receives the boundary line induction signal MS and according to the auxiliary signal segment AS, determines the starting point of the transmission signal ES. The microcontroller 274 is configured to sample at the starting point of the transmit signal segment, perform a multiply-accumulate operation with a sine or cosine function, and calculate the magnitude and phase. Since directions of magnetic fields inside and outside the boundary line 11 are opposite, when the smart mower 20 is located outside the boundary line 11, the boundary line induction signal MS generated by the signal receiving module 26 is opposite to the boundary line induction signal MS detected by the signal receiving module 26 inside the boundary line 11 in phase, while other parameters are the same as shown in FIG. 5B and FIG. 5C. FIG. 5B shows a waveform diagram of a boundary line induction signal of the smart mower inside the boundary line, and FIG. 5C shows a waveform diagram of a boundary line induction signal of the smart mower outside the boundary line. In another example, for example, when the direction of the current flowing through the boundary line 11 is opposite to the direction of the current flowing through the boundary line 11 shown in FIG. 1, that is, the positive and negative electrodes of the boundary line 11 are exchanged. In this case, FIG. 5B shows a waveform diagram of a boundary line induction signal of the smart mower outside the boundary line, and FIG. 5C shows a waveform diagram of a boundary line induction signal of the smart mower inside the boundary line. The microcontroller 274 can determine whether the smart mower 20 is located inside the boundary line 11 according to the phase result and determine the distance between the smart mower 20 and the boundary line 11 according to the amplitude, thereby sending a control signal to the drive module 24 to control the walking direction of the smart mower 20.

In some other examples, the boundary signal BS is a periodic signal in which the transmission signal ES and a vacant signal VS occur alternately. The waveform of the transmission signal ES is a continuous change of a time function, such as the first sine wave of the first phase. The vacant signal VS is that no current signal flows inside the boundary line 11. The signal receiving module 26 detects the boundary signal BS and converts the boundary signal BS into the boundary line induction signal MS to transmit the boundary line induction signal MS to the control module 27.

Figure 6:
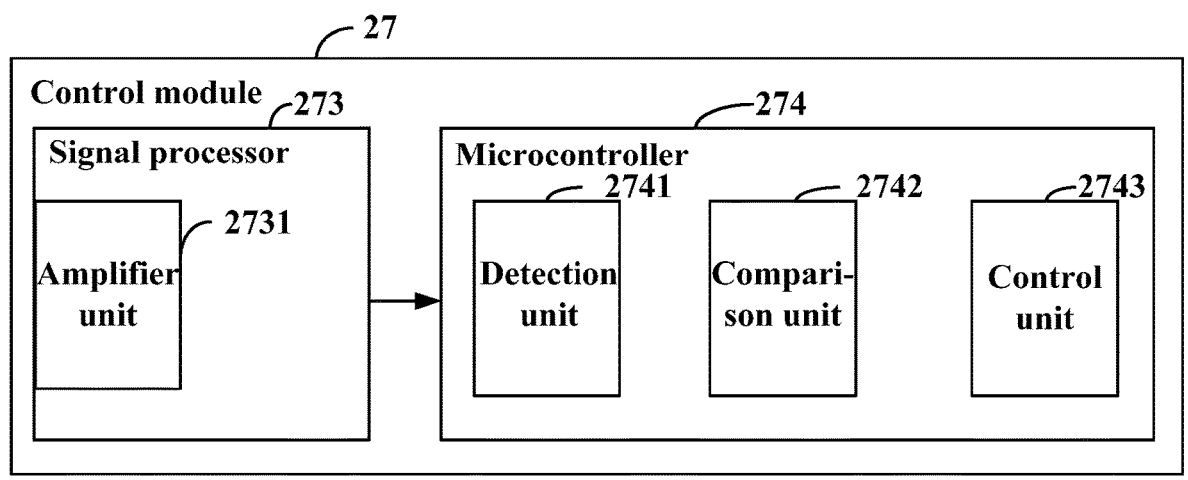
FIG. 6 is a circuit block diagram of the smart mowing system shown in FIG. 3.

The control module 27 is configured to be able to determine whether the smart mower 20 is in the working area according to the change of the boundary line induction signal. In one example, the control module 27 includes the signal processor 273 and the microcontroller 274. Referring to FIG. 6, a signal processor 273 includes an amplifier unit 2731 electrically connected to the signal receiving module 26. The amplifier unit 2731 is configured to amplify the boundary line induction signal MS transmitted by the signal receiving module 26 and generate a processed signal PS. The signal processor 273 receives the boundary line induction signal MS and transmits the processed signal PS to the microcontroller 274. The microcontroller 274 receives the processed signal PS, compares peak values or valley values of adjacent periods of the processed signal PS and according to the comparison result, determines whether the mower is in the working area, thereby controlling the walking direction of the smart mower 20. In another example, the microcontroller 274 receives the processed signal PS, compares amplitude change rates of the preceding and following periods of the processed signal PS and according to the comparison result, determines whether the mower is in the working area. The microcontroller 274 is further configured to output a walking control signal to the drive module 24 according to whether the smart mower 20 is in the working area to control the walking direction of the smart mower 20. For example, when the smart mower 20 is outside the boundary line, that is, the smart mower is in the non-working area, the microcontroller 274 outputs a walking control signal to the drive module 24 to drive the smart mower 20 to walk inside the working area.

Since waveforms of the transmission signal ES and the vacant signal VS do not continuously change, an abrupt change in the waveform, such as a change in amplitude, occurs at the junction of the vacant signal segment VS and the transmit signal segment ES. The processed signal PS includes a first signal segment and a second signal segment. The first signal segment corresponds to the waveform with an abrupt change at the junction of the vacant signal segment VS and the transmit signal segment ES. The second signal segment corresponds to the waveform with an abrupt change at the junction of the transmit signal segment ES and the vacant signal segment VS. The appearance of an abrupt change may be different in signal amplitudes. The microcontroller 274 includes a detection unit 2741, a comparison unit 2742 and a control unit 2743. The detection unit 2741 is configured to detect and record peak values and valley values of two adjacent periods of the processed signal PS and transmit a comparison signal to the comparison unit 2742. The comparison unit 2742 compares the received peak values and valley values of the adjacent periods, thereby determining whether the smart mower 20 is in the working area inside the boundary line 11 or in the non-working area outside the boundary line 11. Then a control signal is sent to the control unit, thereby controlling the walking direction of the smart mower 20. In another example, the detection unit 2741 is configured to detect and record the change in the amplitude of the upper half wave and the lower half wave of two adjacent periods of the processed signal PS at the same sampling time and transmits a comparison signal to the comparison unit 2742. The comparison unit compares the received amplitude change rates of the adjacent periods, thereby determining whether the smart mower 20 is in the working area inside the boundary line 11 or in the non-working area outside the boundary line 11. Then a control signal is sent to the control unit, thereby controlling the walking direction of the smart mower 20.

Figure 7:
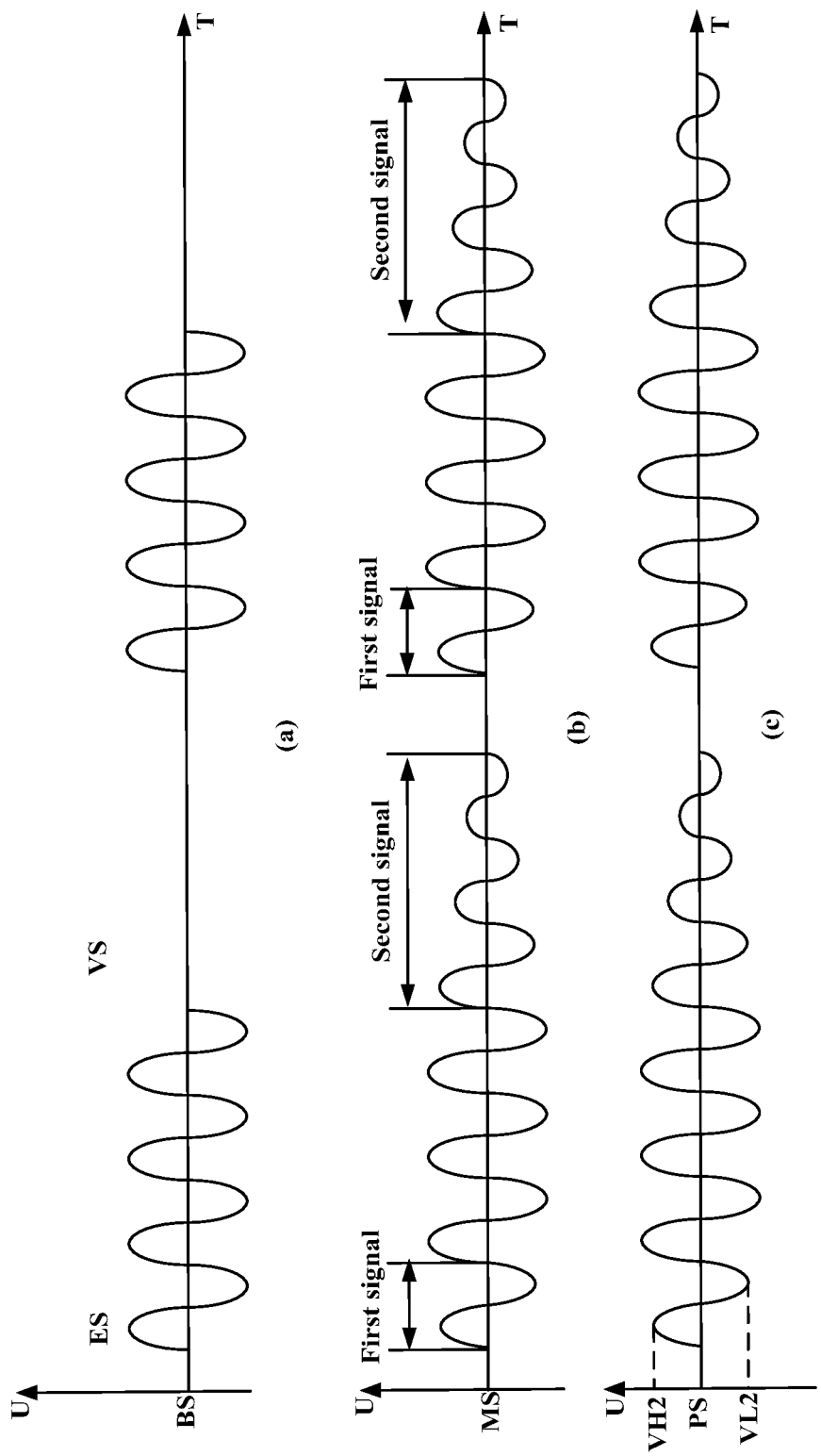
FIG. 7 is a waveform diagram (a) of a boundary signal, a waveform diagram (b) of a boundary line induction signal, and a waveform diagram (c) of a processed signal according to a second example.

Referring to FIG. 7, in an example, the boundary signal BS is a periodic signal in which a transmit signal segment ES and the vacant signal segment VS occur alternately. The transmit signal segment ES is a sine wave signal. The signal transmitting unit 12 transmits a sine wave signal of predetermined duration at fixed intervals. The signal receiving module 26 can convert the boundary signal into the boundary line induction signal MS and transmit the boundary line induction signal MS to the signal processor 273. The signal processor 273 further processes the boundary line induction signal MS and transmits the processed signal PS to the microcontroller 274. The detection unit in the microcontroller 274 detects the voltage peak value VH2 and the valley value VL2 of the current period and the voltage peak value VH1 and valley value VL1 of the previous period of the first signal segment where the abrupt change occurs corresponding to the junction of the vacant signal VS and the transmission signal ES. In this example, the voltage values VH1 and VL1 of the previous period are zero. The voltage values VH1 and VL1 are recorded and transmitted to the comparison unit 2742 for comparison. When enhancement of the peak value is detected first, that is, when the voltage peak value VH1 is less than the voltage peak value VH2, it is determined that the smart mower 20 is in the working area inside the boundary line 11. Then the comparison unit sends a first control signal to the control unit 2743 to drive the smart mower 20 to walk. In some other examples, the detection unit detects amplitude change rates of two adjacent periods of the first signal segment at the same sampling time, records and transmits the amplitude change rates to the comparison unit 2742 for comparison. When the amplitude change rate of the upper half wave is first detected to increase, it is determined that the smart mower 20 is in the working area inside the boundary line.

Figure 8:
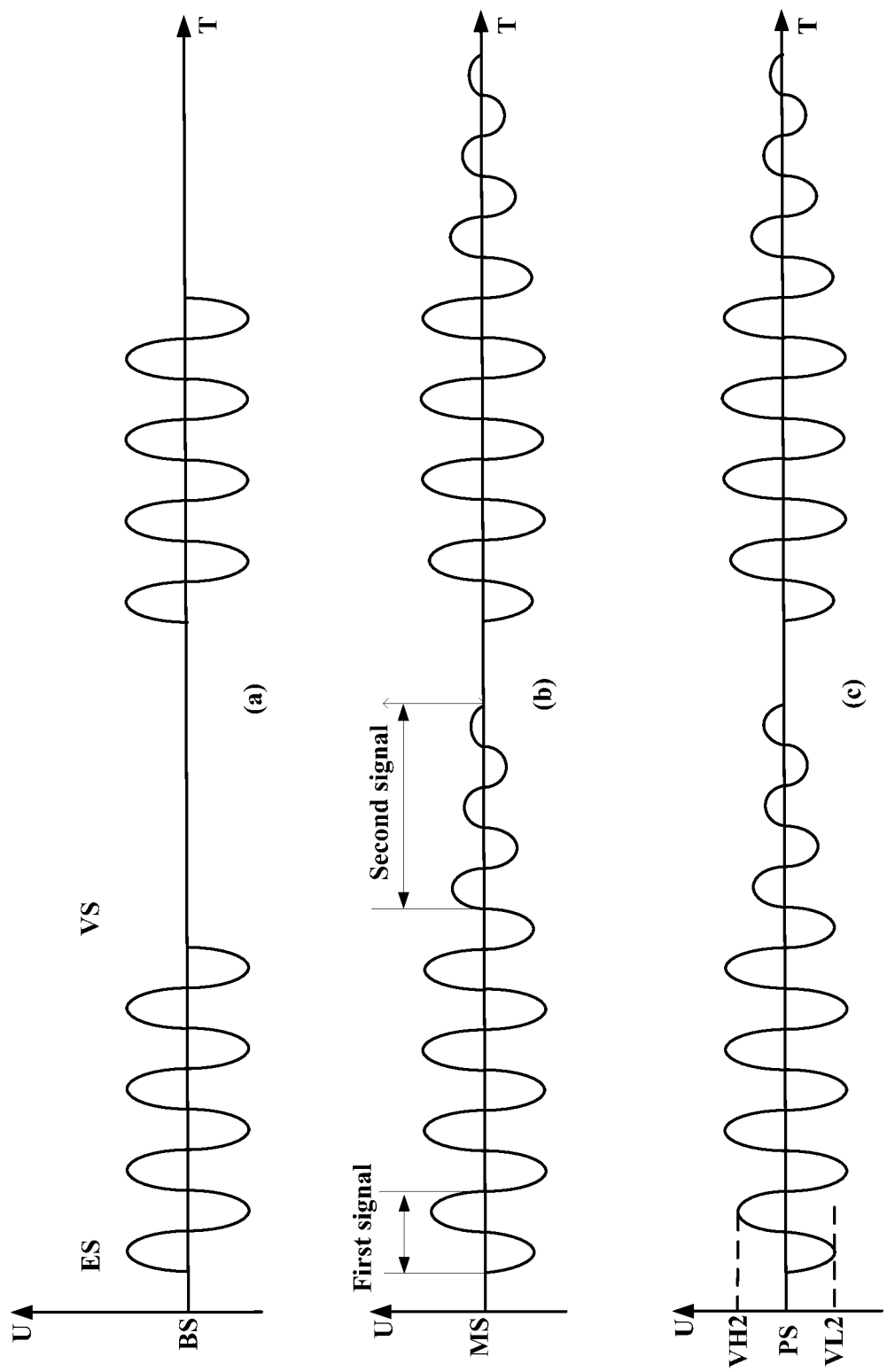
FIG. 8 is a waveform diagram (a) of a boundary signal, a waveform diagram (b) of a boundary line induction signal, and a waveform diagram (c) of a processed signal according to a third example.

Referring to FIG. 8, when the smart mower 20 is outside the boundary line 11, the signal receiving module 26 detects a magnetic field and generates a boundary line induction signal MS as shown in FIG. 8B. Since magnetic field directions inside and outside the boundary line 11 are opposite, when the smart mower 20 is outside the boundary line 11, the boundary line induction signal MS generated by the signal receiving module 26 is opposite in phase to the boundary line induction signal MS detected by the signal receiving module 26 inside the boundary line 11, while other parameters are the same. The signal receiving module 26 detects the boundary line induction signal MS and transmits the boundary line induction signal MS to the signal processor 273. The signal processor 273 further processes the boundary line induction signal MS and transmits the processed signal to the microcontroller 274. A detection unit 2741 in the microcontroller 274 detects the voltage peak value VH2 and the valley value VL2 of the current period and the voltage peak value VH1 and valley value VL2 of the previous period of a first signal segment where the abrupt change occurs corresponding to the junction of the vacant signal segment VS and the transmit signal segment ES. In this example, the voltage values VH1 and VL1 of the previous period are zero. The voltage peak values VH1 and VH2 and valley values VL1 and VL2 are recorded and transmitted to the comparison unit 2742 for comparison. When enhancement of the valley value is detected first, that is, when the voltage valley value VL1 is less than the voltage valley value VL2, it is determined that the smart mower 20 is in the non-working area outside the boundary line 11. Then the comparison unit 2742 sends a second control signal to the control unit 2743 to drive the smart mower 20 to walk inside the boundary line 11. In some other examples, the detection unit detects amplitude change rates of two adjacent periods of the first signal segment at the same sampling time, records and transmits the amplitude change rates to the comparison unit 2742 for comparison. When the amplitude change rate of the lower half wave is first detected to increase, it is determined that the smart mower 20 is in the non-working area outside the boundary line 11. Then the comparison unit 2742 sends a second control signal to the control unit 2743 to drive the smart mower 20 to walk inside the boundary line 11.

To determine whether the smart mower 20 is in the working area inside the boundary line 11 or in the non-working area outside the boundary line 11, the microcontroller 274 detects the peak values VH1 and VH2 and the valley values VL1 and VL2 of two adjacent periods of the first signal segment. In addition to the preceding examples, the microcontroller 274 may also be configured to detect the voltage peak value VH2 and the valley value VL2 of the current period and the voltage peak value VH1 and valley value VL1 of the previous period of the second signal segment where the abrupt change occurs at the junction of the transmit signal segment ES and the vacant signal segment VS.

Figure 9:
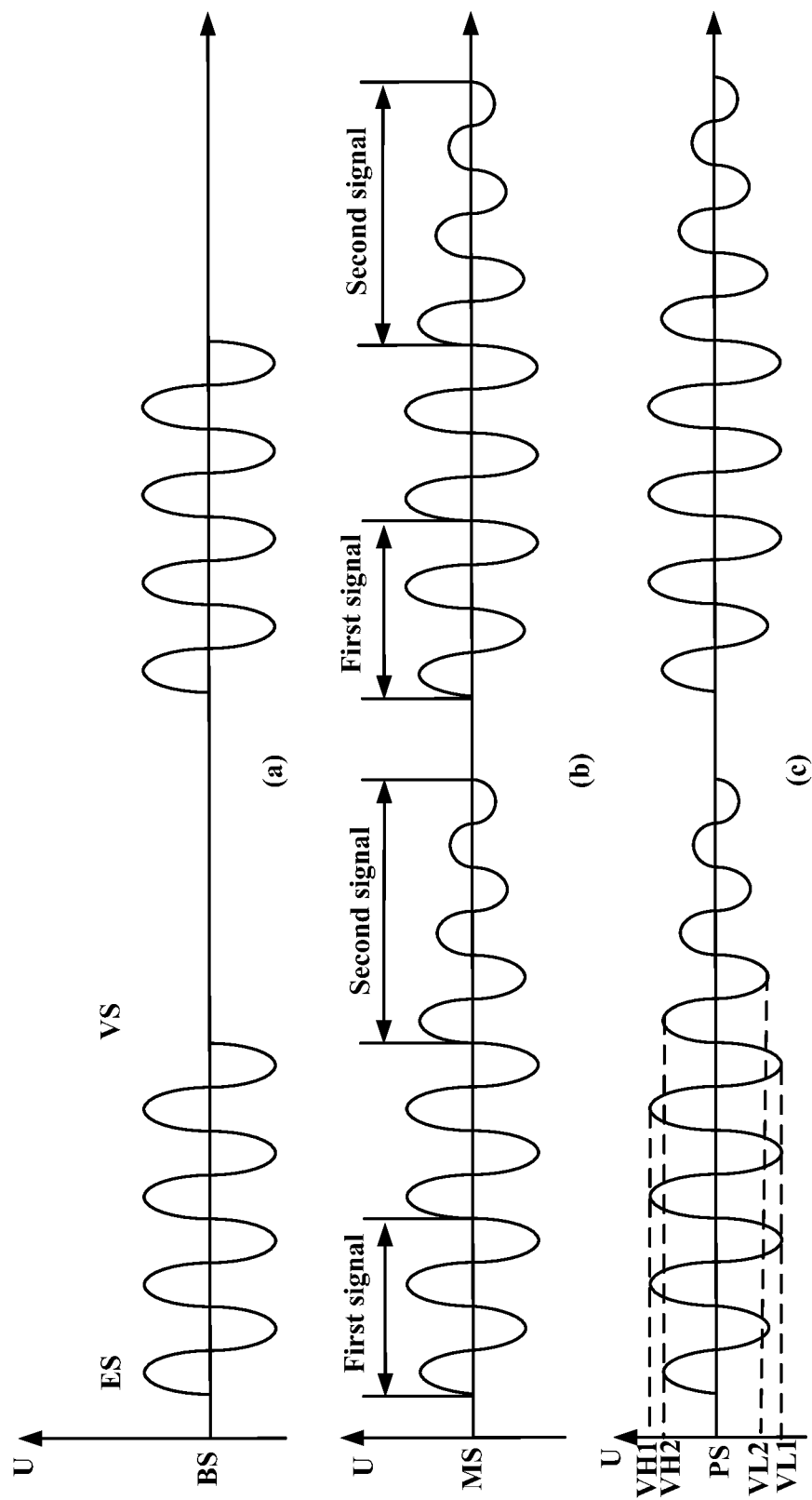
FIG. 9 is a waveform diagram (a) of a boundary signal, a waveform diagram (b) of a boundary line induction signal, and a waveform diagram (c) of a processed signal according to a fourth example.

Exemplarily, referring to FIG. 9, when the smart mower 20 is in the working area inside the boundary line 11, the signal receiving module 26 detects a boundary line induction signal MS and transmits the boundary line induction signal MS to the signal processor 273. The signal processor 273 further processes the boundary line induction signal MS and transmits the processed signal PS to the microcontroller 274. The detection unit 2741 in the microcontroller 274 detects the voltage peak value VH2 and valley value VL2 of the current period and the voltage peak value VH1 and valley value VL1 of the previous period of a second signal segment. The voltage peak values VH1 and VH2 and valley values VL1 and VL2 are recorded and transmitted to the comparison unit 2742 for comparison. When weakening of the peak value is detected first, that is, when the voltage peak value VH1 is greater than the voltage peak value VH2, it is determined that the smart mower 20 is in the working area inside the boundary line 11. Then the comparison unit 2742 sends a first control signal to the control unit 2743 to drive the smart mower 20 to walk.

Figure 10:
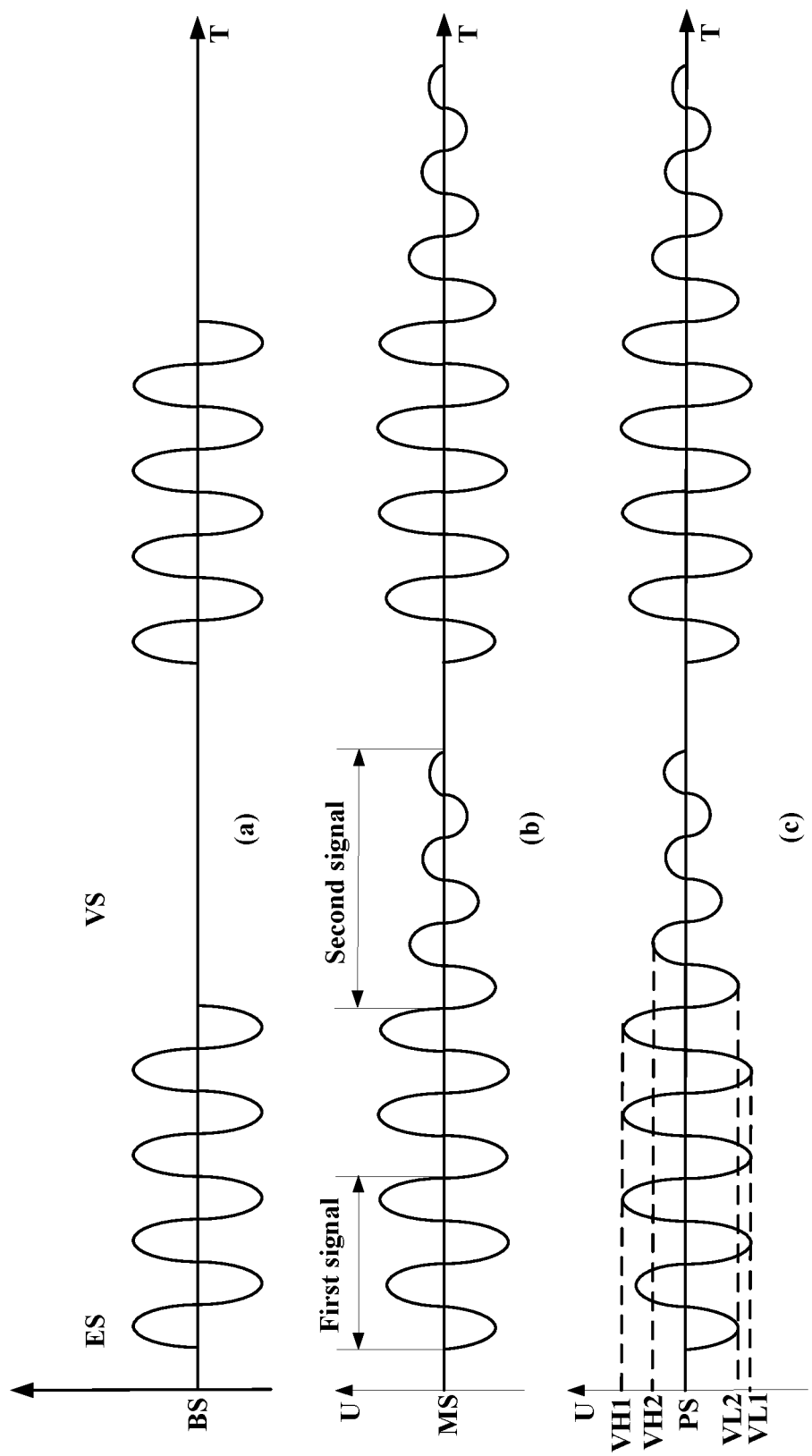
FIG. 10 is a waveform diagram (a) of a boundary signal, a waveform diagram (b) of a boundary line induction signal and a waveform diagram (c) of a processed signal according to a fifth example.

Referring to FIG. 10, when the smart mower 20 is in the working area outside the boundary line 11, the signal receiving module 26 detects a boundary line induction signal MS and sends the boundary line induction signal MS to the signal processor 273. The signal processor 273 further processes the boundary line induction signal and transmits the processed signal PS to the microcontroller 274. The detection unit 2741 in the microcontroller 274 detects the voltage peak value VH2 and valley value VL2 of the current period and the voltage peak value VH1 and valley value VL1 of the previous period of a second signal segment. The voltage peak values VH1 and VH2 and valley values VL1 and VL2 are recorded and transmitted to the comparison unit 2742 for comparison. When weakening of the valley value is detected first, that is, when the voltage valley value VL1 is greater than the voltage valley value VL2, it is determined that the smart mower 20 is in the non-working area outside the boundary line 11. Then the comparison unit 2742 sends a second control signal to the control unit 2743 to drive the smart mower 20 to walk inside the boundary line 11.

Since waveforms of the transmit signal segment ES and the vacant signal segment VS do not continuously change, an abrupt change in the waveform occurs at the junction of the vacant signal segment VS and the transmit signal segment ES. Thus, by detecting changes in the waveform, such as changes in the amplitude, it is possible to accurately determine whether the smart mower is in the working area inside the boundary line 11. Since the vacant signal segment VS is provided in the boundary signal BS, no current flows inside the boundary line when in the vacant signal segment VS, thereby making a boundary module more energy-saving. Moreover, the boundary signal BS includes only one sine wave signal, and the structure of the signal transmitting unit 12 is simpler.

To determine whether the smart mower 20 is located in the working area inside the boundary line 11 or in the non-working area outside the boundary line 11, in addition to setting the transmission signal ES as the above-described sine wave signal of predetermined duration transmitted at fixed intervals, the transmission signal ES may be a sine wave signal whose phase changes at preset intervals.

Figure 11:
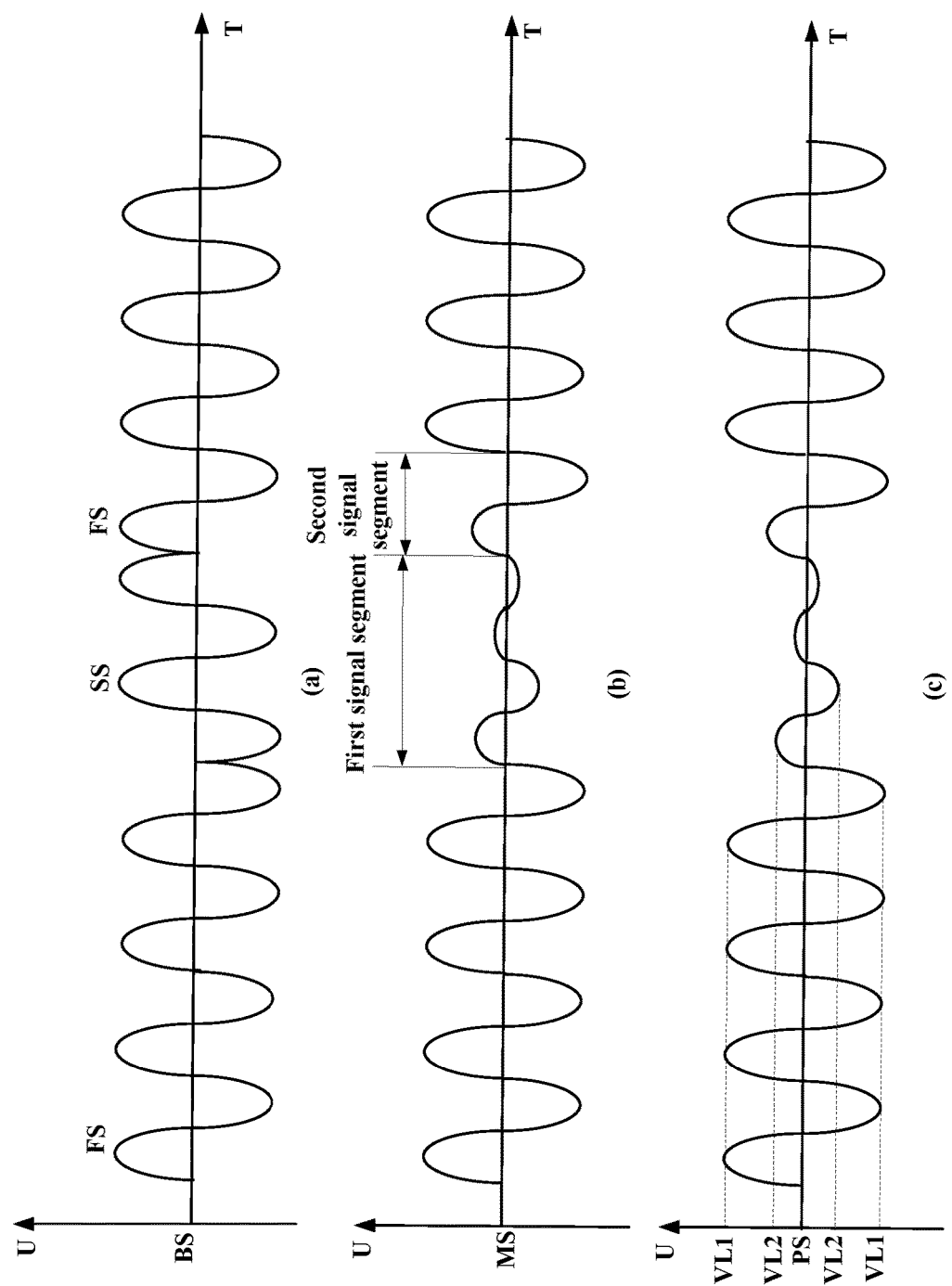
FIG. 11 is a waveform diagram (a) of a boundary signal, a waveform diagram (b) of a boundary line induction signal, and a waveform diagram (c) of a processed signal according to a sixth example.

Referring to FIG. 11, the boundary signal BS includes a transmit signal segment and an inhibit signal segment. The transmit signal segment is a first sine wave signal FS of a first phase. The inhibit signal segment is a second sine wave signal SS of a second phase. The first sine wave signal FS is converted into the second sine wave signal SS at preset intervals. The second sine wave signal SS is an inhibit signal. In some examples, the first sine wave signal FS is opposite in phase to the second sine wave signal SS. Since waveforms of the first sine wave signal FS and the second sine wave signal SS do not continuously change, an abrupt change in the waveform, such as a change in amplitude, occurs at the junction of the first sine wave signal FS and the second sine wave signal SS. Thus, the first signal segment corresponds to the abrupt waveform occurring at the junction of the first sine wave signal FS and the second sine wave signal SS. Moreover, the second signal segment corresponds to the abrupt waveform occurring at the junction of the second sine wave signal SS and the first sine wave signal FS. The manifestation of abrupt changes is different signal amplitudes.

When the smart mower 20 is in the working area inside the boundary line 11, the signal receiving module 26 induces the boundary line induction signal MS and sends the boundary line induction signal MS to the signal processor 273. The signal processor 273 further processes the boundary line induction signal MS and transmits the processed signal PS to the microcontroller 274. The processed signal PS includes the first signal segment corresponding to the junction of the first sine wave signal FS and the second sine wave signal SS and the second signal segment corresponding to the junction of the second sine wave signal SS and the first sine wave signal FS. In some examples, the detection unit 2741 in the microcontroller 274 detects the voltage peak value VH2 and valley value VL2 of the current period and the voltage peak value VH1 and valley value VL1 of the previous period of the first signal segment. The voltage peak values VH1 and VH2 and valley values VL1 and VL2 are recorded and transmitted to the comparison unit 2742 for comparison. When weakening of the peak value is detected first, that is, VL1 is greater than VL2, it is determined that the smart mower 20 is in the working area inside the boundary line 11. Then the comparison unit 2742 sends a first control signal to the control unit 2743.

Figure 12:
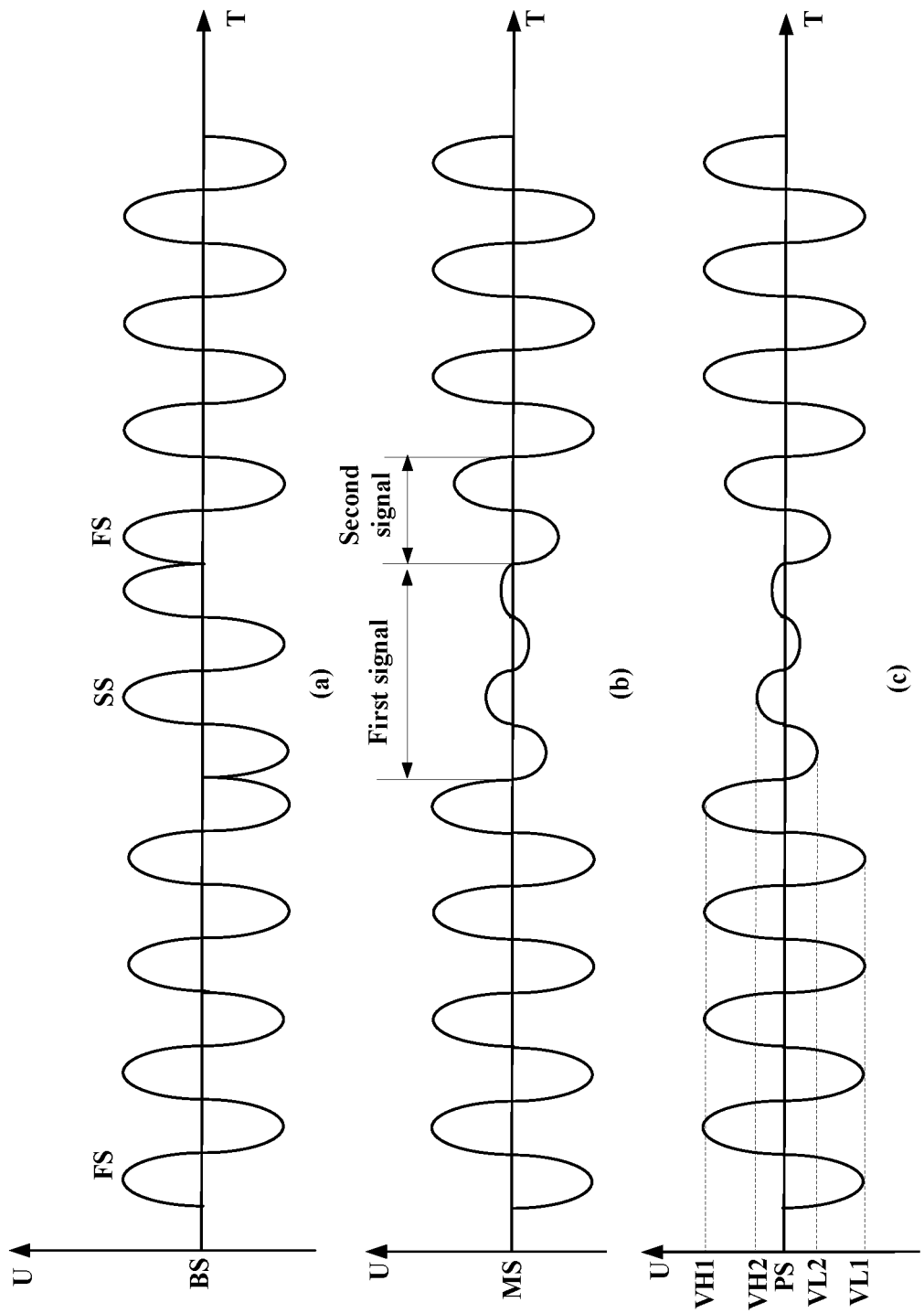
FIG. 12 is a waveform diagram (a) of a boundary signal, a waveform diagram (b) of a boundary line induction signal, and a waveform diagram (c) of a processed signal according to a seventh example.

Referring to FIG. 12, when the smart mower 20 is outside the boundary line 11, the signal receiving module 26 detects a magnetic field and generates a boundary line induction signal MS as shown in FIG. 12B. Since magnetic field directions inside and outside the boundary line 11 are opposite, when the smart mower 20 is outside the boundary line 11, the boundary line induction signal MS generated by the signal receiving module 26 is opposite in phase to the boundary line induction signal MS detected by the signal receiving module 26 inside the boundary line 11, while other parameters are the same. The signal receiving module 26 induces the boundary line induction signal MS and sends the boundary line induction signal MS to the signal processor 273. The signal processor 273 further processes the boundary line induction signal MS and transmits the processed signal PS to the microcontroller 274. The detection unit 2741 in the microcontroller 274 detects the voltage peak value VH2 and valley value VL2 of the current period and the voltage peak value VH1 and valley value VL1 of the previous period of the first signal segment. The voltage peak values VH1 and VH2 and valley values VL1 and VL2 are recorded and transmitted to the comparison unit 2742 for comparison. When weakening of the valley value is detected first, that is, when the voltage valley value VL1 is greater than the voltage valley value VL2, it is determined that the smart mower 20 is in the non-working area outside the boundary line 11. Then the comparison unit 2742 sends a second control signal to the control unit 2743 to drive the smart mower 20 to walk inside the boundary line 11.

The detection unit 2741 in the microcontroller 274 may also detect the voltage peak value VH2 and valley value VL2 of the current period and the voltage peak value VH1 and valley value VL1 of the previous period of the second signal segment. The voltage peak values VH1 and VH2 and valley values VL1 and VL2 are recorded and transmitted to the comparison unit 2742 for comparison. When enhancement of the peak value is detected first, that is, the voltage peak value VH1 is less than the voltage peak value VH2, it is determined that the smart mower 20 is in the working area inside the boundary line 11. Then the comparison unit 2742 sends a first control signal to the control unit 2743. When enhancement of the valley value is detected first, that is, the voltage valley value SL1 is less than the voltage valley value SL2, it is determined that the smart mower 20 is in the non-working area outside the boundary line 11. Then the comparison unit 2742 sends a second control signal to the control unit 2743 to drive the smart mower 20 to walk inside the boundary line 11.

In other examples, the second sine wave signal SS having a different phase from the first sine wave signal FS is adopted as the boundary signal BS. The second sine wave signal corresponds to an inhibit signal, and the amplitude of the first sine wave signal can be suppressed so that the microcontroller 274 detects more obvious changes in peak values or valley values of waveforms of two adjacent periods, thereby enabling the microcontroller 274 to more accurately determine the area where the smart mower 20 is located.

Figure 13:
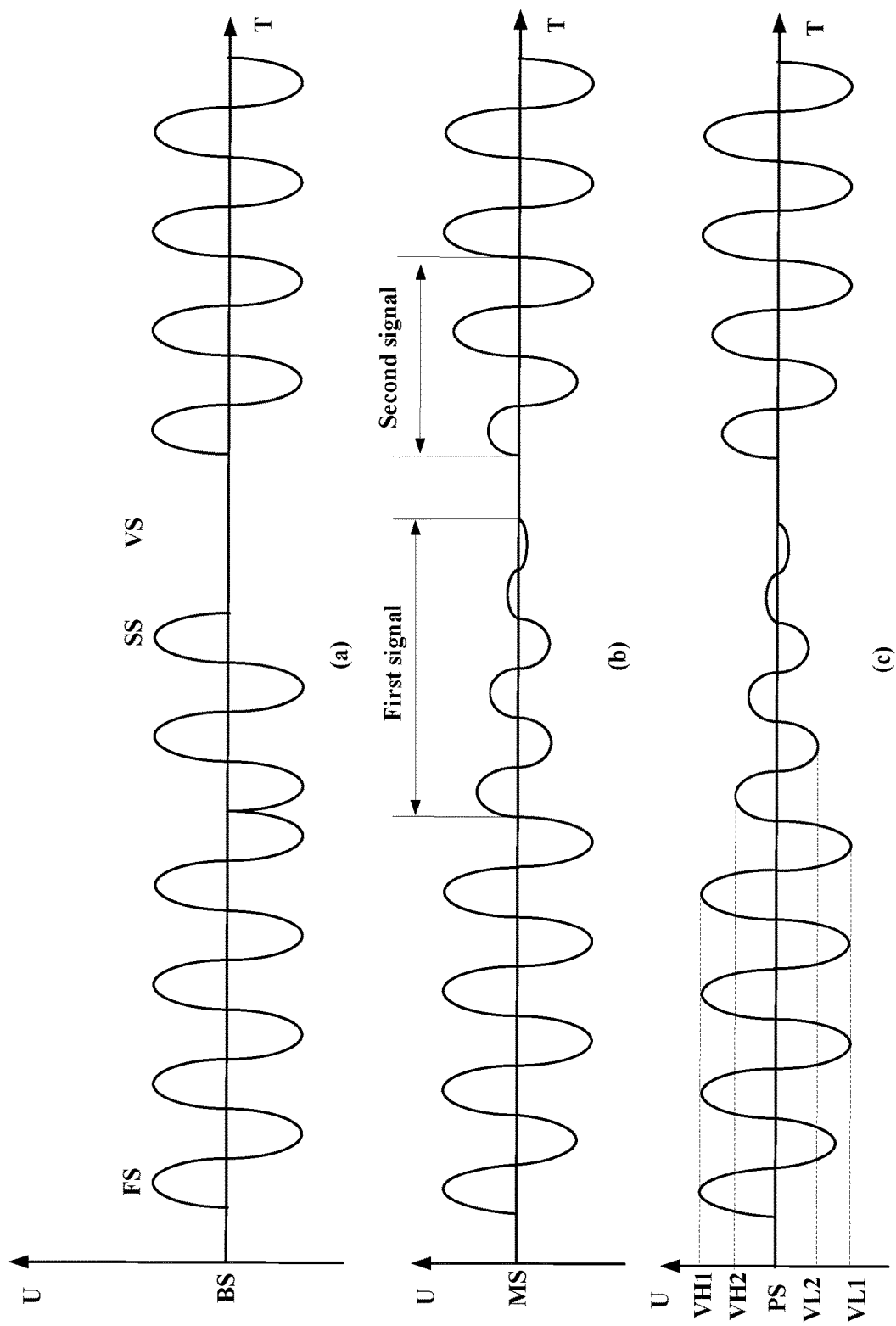
FIG. 13 is a waveform diagram (a) of a boundary signal, a waveform diagram (b) of a boundary line induction signal, and a waveform diagram (c) of a processed signal according to an eighth example.

The boundary signal BS may also be provided with a vacant signal segment of certain duration. In some examples, a vacant signal segment VS of certain duration is provided after one period of the first sine wave signal and the second sine wave signal. Thus, the first signal segment corresponds to the abrupt waveform occurring at the junction of the first sine wave signal FS and the second sine wave signal SS. Moreover, the second signal segment corresponds to the abrupt waveform occurring at the junction of the vacant signal VS and the first sine wave signal FS. Referring to FIG. 13, when the smart mower 20 is in the working area inside the boundary line 11, the signal receiving module 26 detects a boundary line induction signal MS and sends the boundary line induction signal MS to the signal processor 273. The signal processor 273 further processes the boundary line induction signal and transmits the processed signal PS to the microcontroller 274. The detection unit 2741 in the microcontroller 274 detects the voltage peak value VH2 and valley value VL2 of the current period and the voltage peak values VH1 and valley values VL1 of the previous period of a first signal segment. The voltage peak values VH1 and VH2 and valley values VL1 and VL2 are recorded and transmitted to the comparison unit 2742 for comparison. When weakening of the peak value is detected first, that is, when the voltage peak value VH1 is greater than the voltage peak value VH2, it is determined that the smart mower 20 is in the working area inside the boundary line 11. When the smart mower 20 is outside the boundary line 11, the signal receiving module 26 detects a boundary line induction signal MS. The signal processor 273 further processes the boundary line induction signal MS and transmits the processed signal PS to the microcontroller 274. The detection unit 2741 in the microcontroller 274 detects the voltage peak value VH2 and valley value VL2 of the current period and the voltage peak value VH1 and valley value VL1 of the previous period of a second signal segment. The voltage peak values VH1 and VH2 and valley values VL1 and VL2 are recorded and transmitted to the comparison unit 2742 for comparison. When weakening of the valley value is detected first, that is, when the voltage valley value VL1 is greater than the voltage valley value VL2, it is determined that the smart mower 20 is in the non-working area outside the boundary line 11. The detection unit 2741 in the microcontroller may also detect the voltage peak value VH2 and valley value VL2 of the current period and the voltage peak value VH1 and valley value VL1 of the previous period of the second signal segment. The voltage peak values VH1 and VH2 and valley values VL1 and VL2 are recorded and transmitted to the comparison unit 2742 for comparison. When enhancement of the peak value is detected first, that is, the voltage peak value VH1 is less than the voltage peak value VH2, it is determined that the smart mower 20 is in the working area inside the boundary line 11. Then the comparison unit 2742 sends a first control signal to the control unit 2743. When enhancement of the valley value is detected first, that is, the voltage valley value VL1 is less than the voltage valley value VL2, it is determined that the smart mower 20 is in the non-working area outside the boundary line 11. Then the comparison unit 2742 sends a second control signal to the control unit 2743 to drive the smart mower 20 to walk inside the boundary line 11.

Figure 14:
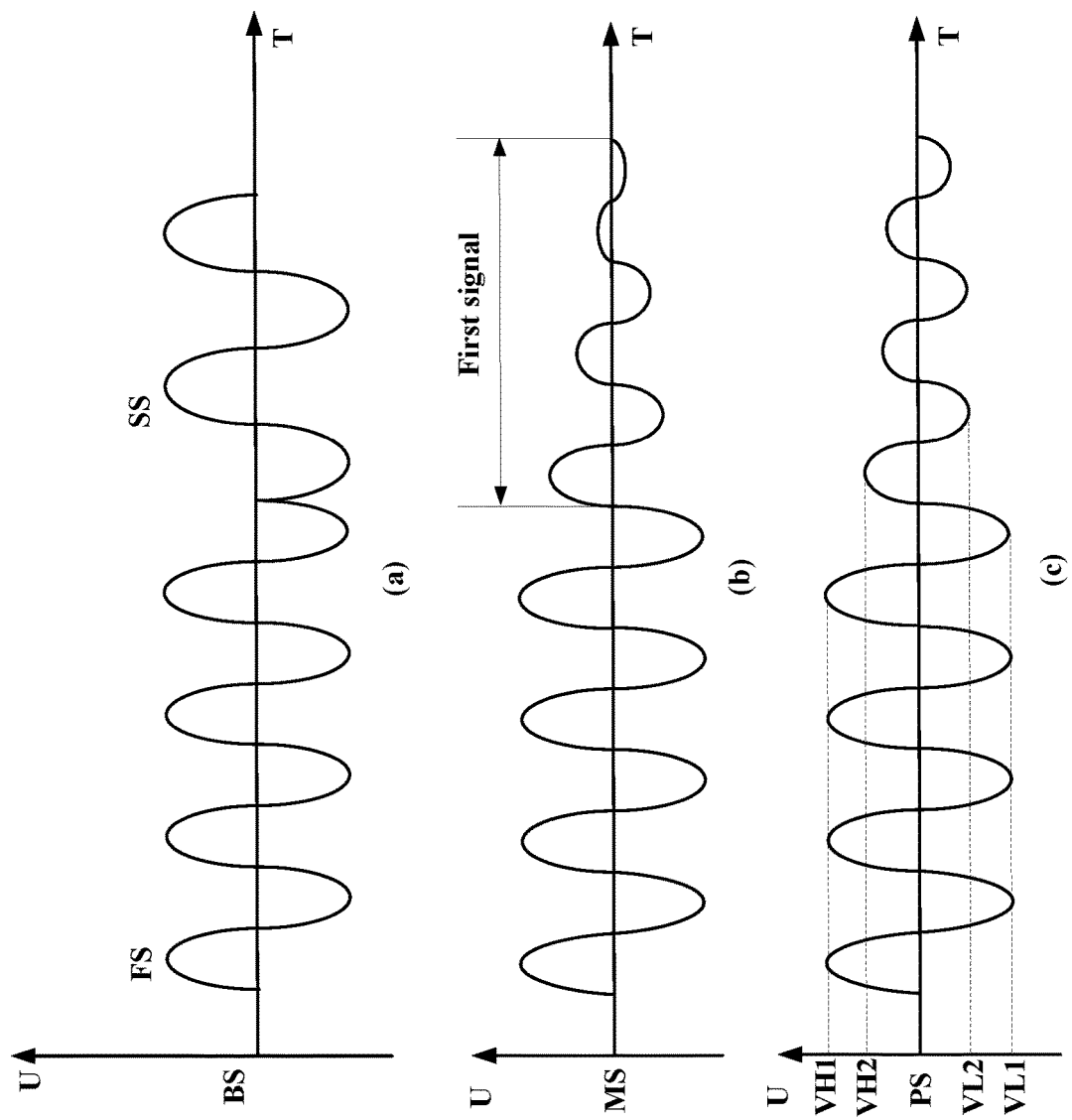
FIG. 14 is a waveform diagram (a) of a boundary signal, a waveform diagram (b) of a boundary line induction signal, and a waveform diagram (c) of a processed signal according to a ninth example.

The boundary signal BS may be set as a sine wave signal whose amplitude, phase and frequency are changed at preset intervals. The boundary signal BS may also be set as a sine wave signal whose amplitude and phase are changed. The boundary signal may also be set as a sine wave signal whose frequency and phase are changed. Referring to FIG. 14, the phase and the frequency of the first sine wave signal FS and the second sine wave signal SS are different. When the smart mower 20 is in the working area inside the boundary line 11, a signal receiving unit detects a boundary line induction signal MS and sends the boundary line induction signal MS to the signal processor 273. The signal processor 273 further processes the boundary line induction signal MS and transmits the processed signal PS to the microcontroller 274. The detection unit 2741 in the microcontroller 274 detects the voltage peak value VH2 and valley value VL2 of the current period and the voltage peak value VH1 and valley value VL1 of the previous period of a first signal segment. The voltage peak values VH1 and VH2 and valley values VL1 and VL2 are recorded and transmitted to the comparison unit 2742 for comparison. When weakening of the peak value is detected first, that is, when the voltage peak value VH1 is greater than the voltage peak value VH2, it is determined that the smart mower 20 is in the working area inside the boundary line 11. When the smart mower 20 is outside the boundary line 11, the signal receiving unit detects a boundary line induction signal MS. The signal processor 273 further processes the boundary line induction signal and transmits the processed signal PS to the microcontroller 274. The microcontroller 274 detects the voltage peak value VH2 and valley value VL2 of the current period and the voltage peak value VH1 and valley value VL1 of the next period of a second signal segment. When weakening of the valley value is detected first, that is, the voltage valley value VL1 is greater than the voltage valley value VL2, it is determined that the smart mower 20 is in the non-working area outside the boundary line 11. Then the comparison unit 2742 sends a second control signal to the control unit 2743 to drive the smart mower 20 to walk inside the boundary line 11.

The boundary signal BS may also be provided with a vacant signal of certain duration. In some examples, a vacant signal VS of certain duration is provided after each period of the first sine wave signal and the second sine wave signal. When the smart mower 20 is in the working area inside the boundary line 11, the signal receiving module 26 detects a boundary line induction signal MS and sends the boundary line induction signal MS to the signal processor 273. The signal processor 273 further processes the boundary line induction signal MS and transmits the processed signal PS to the microcontroller 274. The detection unit 2741 in the microcontroller 274 detects the voltage peak value VH2 and valley value VL2 of the current period and the voltage peak value VH1 and valley value VL1 of the previous period of a first signal segment. The voltage peak values VH1 and VH2 and valley values VL1 and VL2 are recorded and transmitted to the comparison unit 2742 for comparison. When weakening of the peak value is detected first, that is, when the voltage peak value VH1 is greater than the voltage peak value VH2, it is determined that the smart mower 20 is in the working area inside the boundary line 11. When the smart mower 20 is outside the boundary line 11, the signal receiving module 26 detects a boundary line induction signal MS. The signal processor 273 further processes the boundary line induction signal and transmits the processed signal PS to the microcontroller 274. The detection unit 2741 in the microcontroller 274 detects the voltage peak value VH2 and valley value VL2 of the current period and the voltage peak value VH1 and valley value VL1 of the previous period of a second signal segment. The voltage peak values VH1 and VH2 and valley values VL1 and VL2 are recorded and transmitted to the comparison unit 2742 for comparison. When weakening of the valley value is detected first, that is, when the voltage valley value VL1 is greater than the voltage valley value VL2, it is determined that the smart mower 20 is in the non-working area outside the boundary line 11. Then the comparison unit 2742 sends a second control signal to the control unit 2743 to drive the smart mower 20 to walk inside the boundary line 11.

The boundary signal BS may be provided with a vacant signal of certain duration so that the boundary module can be more energy-saving.

To determine whether the smart mower 20 is in the working area inside the boundary line 11 or in the non-working area outside the boundary line 11, in addition to detecting the voltage peak value VH1 and valley value VL1 of the current period, and the voltage peak value VH2 and valley value VL2 of the next period, the microcontroller 274 may also compare amplitude change rates of the previous and next period of the boundary line induction signal MS at the same sampling time. This is not limited herein.

Figure 15:
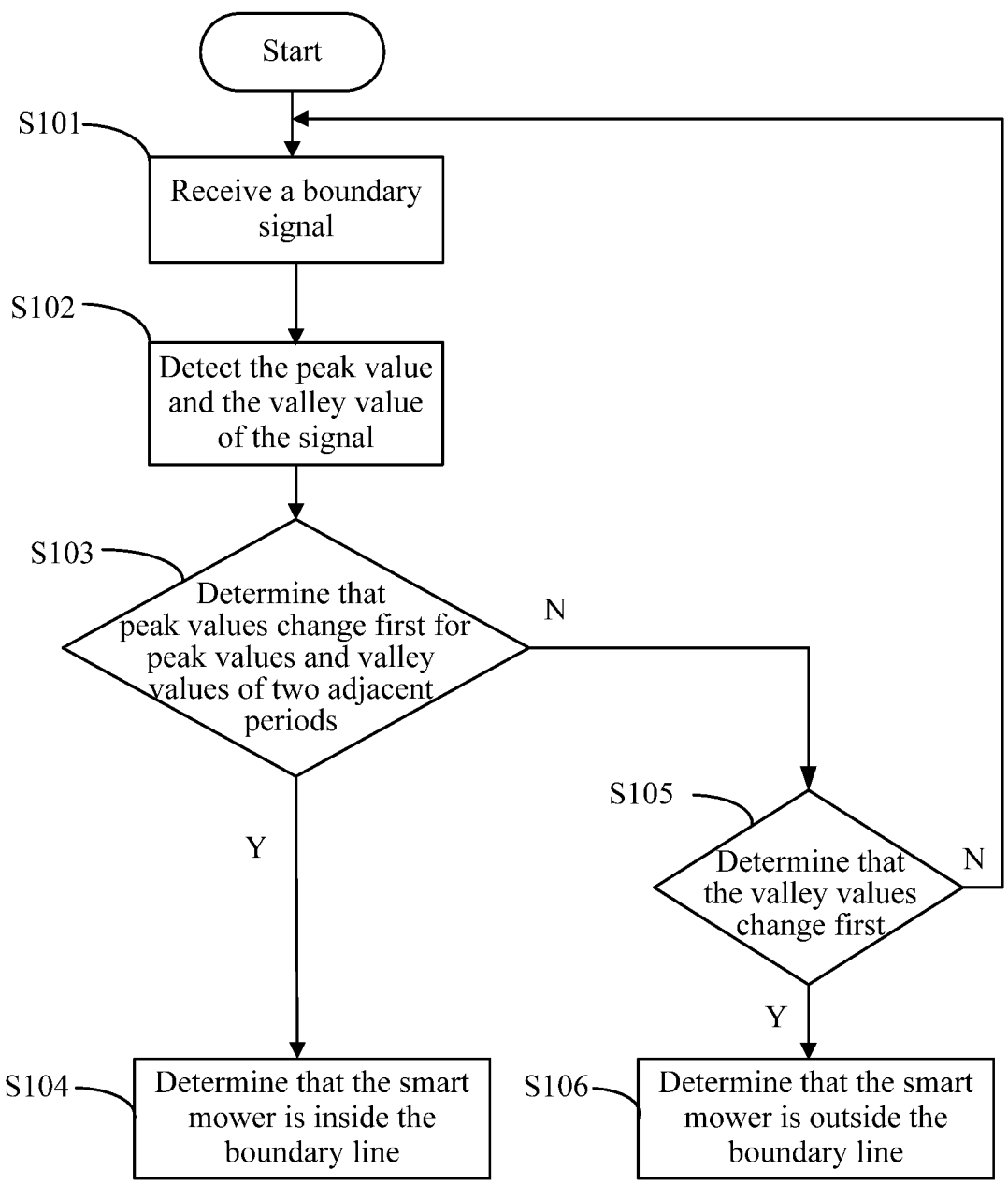
FIG. 15 is a method flowchart of determining whether the smart mower is in or outside the boundary line.

Referring to FIG. 15, a method of determining whether a smart mower is inside or outside a boundary line as described above includes steps S101 to S106.

In step S101, a boundary signal is received.

In this step, the signal transmitting unit 12 generates a boundary signal BS and transmits the boundary signal BS to the boundary line 11. A magnetic field is generated when the boundary signal BS flows through the boundary line 11. The signal receiving module 26 can induce the magnetic field and generate a boundary line induction signal MS.

In step S102, the peak value and the valley value of the signal are detected. In this step, the control module 27 is configured to receive the boundary line induction signal MS. The signal processor 273 in the control module 27 is configured to receive the boundary line induction signal MS. Thus, the boundary line induction signal MS can be amplified, and a processed signal PS is generated. The microcontroller 274 in the control module 27 is configured to receive the processed signal PS, and the detection unit 2741 in the microcontroller 274 is configured to receive the processed signal PS so that peak value and valley value of the processed signal PS can be detected.

In step S103, it is determined that whether peak values change first for peak values and valley values of two adjacent periods. In this step, the comparison unit 2742 in the microcontroller 274 is configured to compare peak values of adjacent periods and compare valley values of adjacent periods. Based on that the peak values of two adjacent periods change first, the method goes to step S104. Based on that the valley values of two adjacent periods change first, the method goes to step S105. It is determined that the smart mower is inside the boundary line.

In step S104, it is determined that the smart mower is inside the boundary line. When the peak values of two adjacent periods change first, increase or decrease, it is determined that the smart mower is inside the boundary line. The comparison unit 2742 in the microcontroller 274 sends a first control signal to the control unit 2743 to drive the smart mower 20 to continue walking.

In step S105, it is determined that whether the valley values change first for the peak values and valley values of two adjacent periods. In this step, the comparison unit 2742 in the microcontroller 274 is configured to compare peak values of adjacent periods and compare valley values of adjacent periods. Based on that the valley values of two adjacent periods change first, the method goes to step S106. Otherwise, the method starts again from step S101.

In step S106, it is determined that the smart mower is outside the boundary line. When the valley values of two adjacent periods change first, increase or decrease, it is determined that the smart mower is outside the boundary line. The comparison unit 2742 in the microcontroller 274 sends a second control signal to the control unit 2743 to drive the smart mower 20 to walk inside the boundary line 11.

Figure 16:
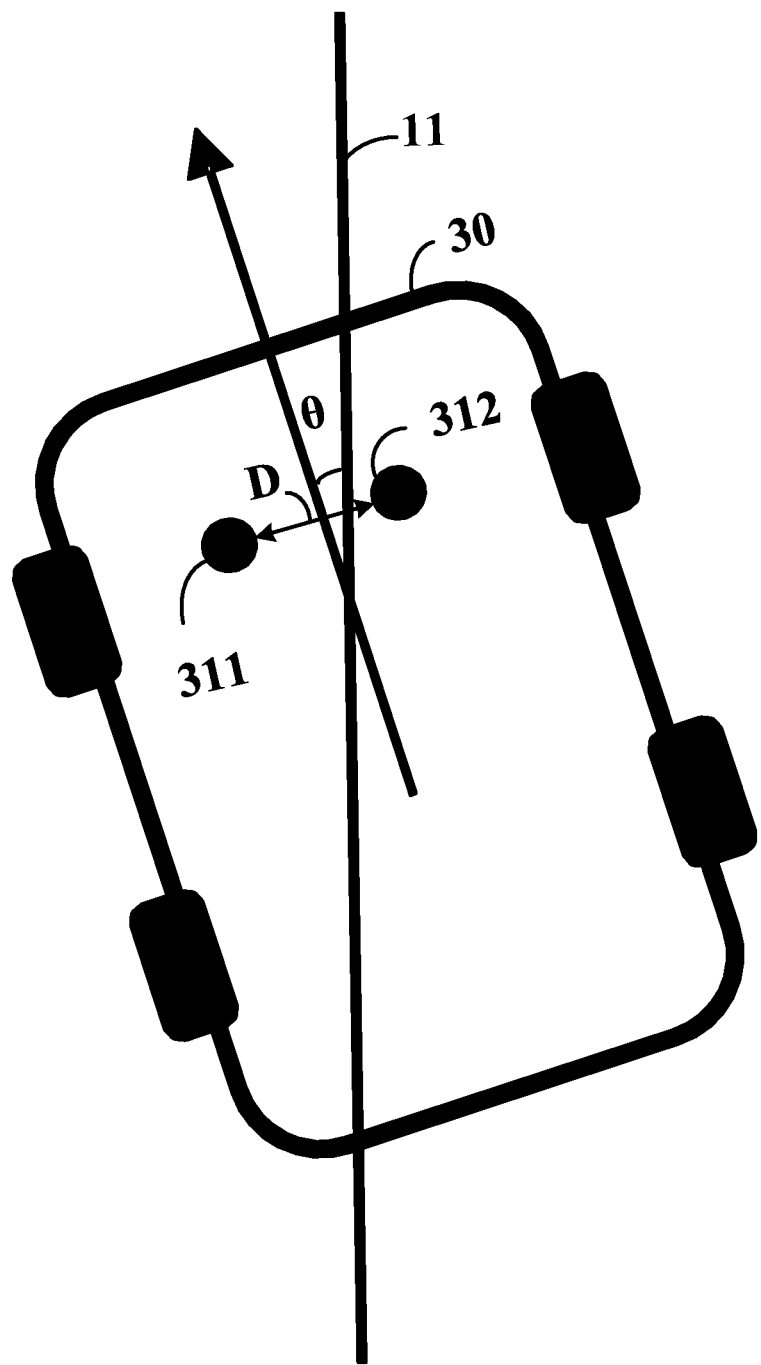
FIG. 16 is a view of a smart mower walking basically along a boundary line according to one example.

In some examples, referring to FIG. 16, a smart mower 30 includes at least two signal receiving modules: a first signal receiving module 311 and a second signal receiving module 312. The first signal receiving module 311 and the second signal receiving module 312 are disposed on the smart mower 30. In some examples, the first signal receiving module 311 and the second signal receiving module 312 are symmetrically distributed around the central axis of the smart mower 30.

Figure 17A:
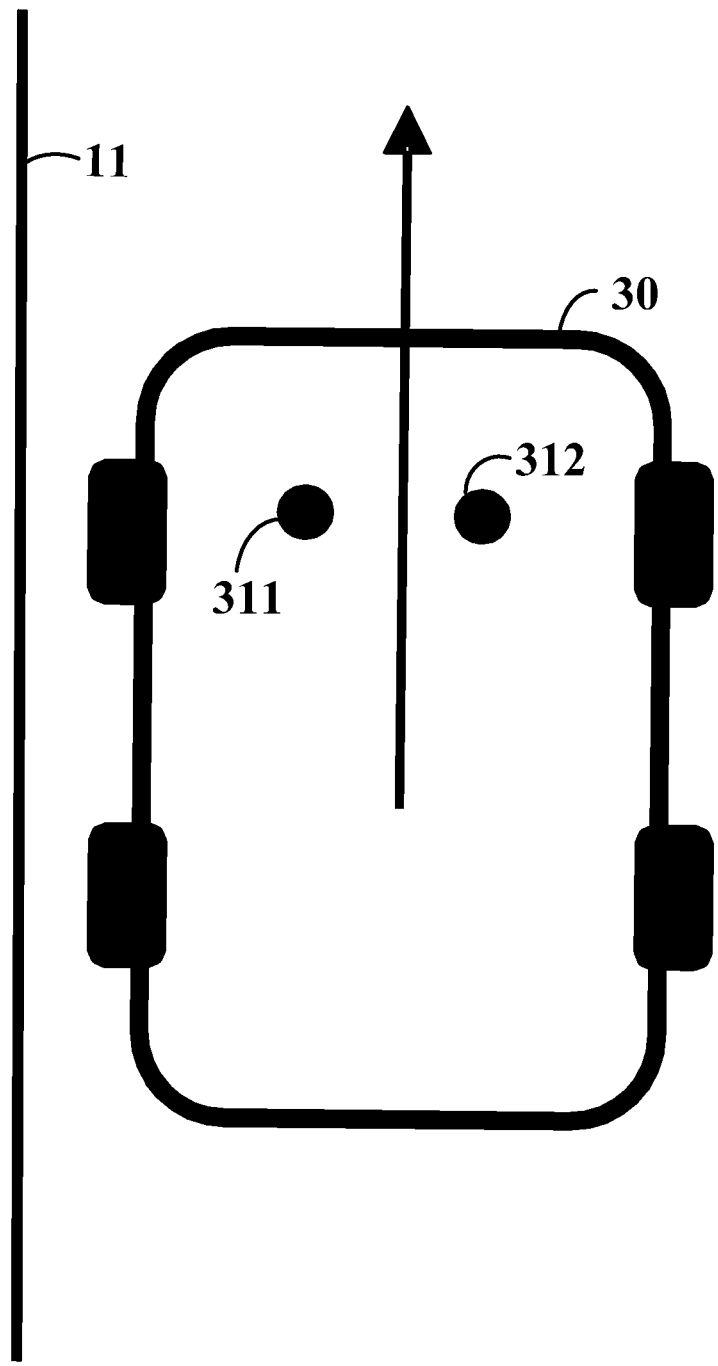
FIG. 17A is a view of a smart mower walking basically along a boundary line according to another example.
Figure 17B:
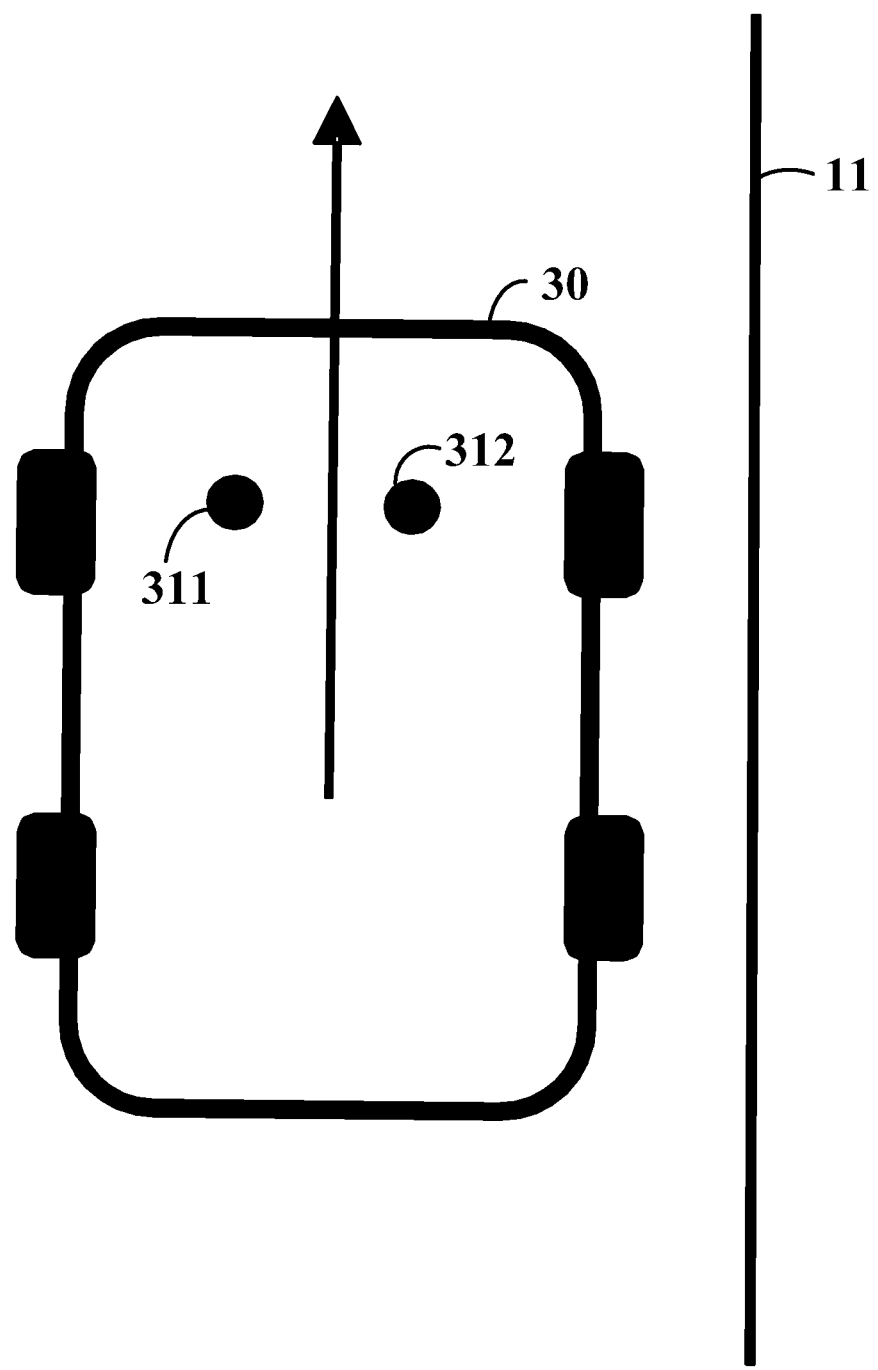
FIG. 17B is a view of a smart mower walking basically along a boundary line according to another example.

The first signal receiving module 311 and the second signal receiving module 312 are configured to detect the magnetic field emitted by the boundary line 11, convert the magnetic field into a corresponding electrical signal and generate a boundary line induction signal MS'. The first signal receiving module 311 induces the change of the magnetic field generated by the boundary signal to generate a first boundary line induction signal FMS'. The second signal receiving module 312 induces the change of the magnetic field generated by the boundary signal to generate a second boundary line induction signal SMS'. The second signal receiving module 312 is a preset distance D away from the first signal receiving module 311. That is, the distance between the first signal receiving module 311 and the second signal receiving module 312 is the preset distance D. The control module 33 is configured to receive the first boundary line induction signal FMS' and the second boundary line induction signal SMS' of the signal receiving module 31. The control module 33 can determine whether the signal receiving module is located in the working area inside the boundary line 11 or in the non-working area outside the boundary line 11 according to the boundary line induction signal MS' and when at least one of the first signal receiving module or the second signal receiving module is located outside the boundary line, control the smart mower to walk basically along the boundary line. The smart mower walks basically along the boundary line, including the smart mower walks along the boundary line 11 as shown in FIG. 16, and the smart mower walks along the boundary line inside or outside the boundary line 11 as shown in FIG. 17A and FIG. 17B.

The method of determining whether the first signal receiving module 311 and the second signal receiving module 312 are located inside the boundary line may adopt the examples described above in FIGS. 4 to 15. In some examples, it is determined whether the first signal receiving module is located inside the boundary line according to at least the first boundary line induction signal and acquiring the voltage peak value VH1 and valley value in the current period and the voltage peak value VH2 and valley value VL2 in the previous period of the first boundary line induction signal. Moreover, it is determined whether the second signal receiving module is located inside the boundary line according to at least the second boundary line induction signal and acquiring the voltage peak value SH2 and valley value SL2 in the current period and the voltage peak value SH1 and valley value SL1 in the previous period of the second boundary line induction signal. These will not be described here.

The control module 33 is configured to, when at least one of the first signal receiving module 311 or the second signal receiving module 312 is located outside the boundary line, acquire the attitude of the smart mower relative to the boundary line, thereby controlling the smart mower to basically walk along the boundary line according to the attitude of the smart mower relative to the boundary line.

The attitude of the smart mower relative to the boundary line includes the included angle between the heading direction of the smart mower and the boundary line 11 and at least one of a first vertical distance Y1 between the first signal receiving module 311 and the boundary line 11 or a second vertical distance Y2 between the second signal receiving module 312 and the boundary line 11. The control module 33 is configured to calculate the first vertical distance between the first signal receiving module 311 and the boundary line 11 based on the amplitude of the first boundary line induction signal; calculate the second vertical distance between the second signal receiving module and the boundary line based on the amplitude of the second boundary line induction signal; and calculate the included angle θ between the heading direction of the smart mower and the boundary line 11 based on the first vertical distance Y1, the second vertical distance Y2 and the preset distance D. The control module may determine the vertical distance Y1 between the first signal receiving module 311 and the boundary line 11 according to the signal amplitude of the first boundary line induction signal FMS' and determine the vertical distance Y2 between the second signal receiving module 312 and the boundary line 11 according to the signal amplitude of the second boundary line induction signal.

Figure 18:
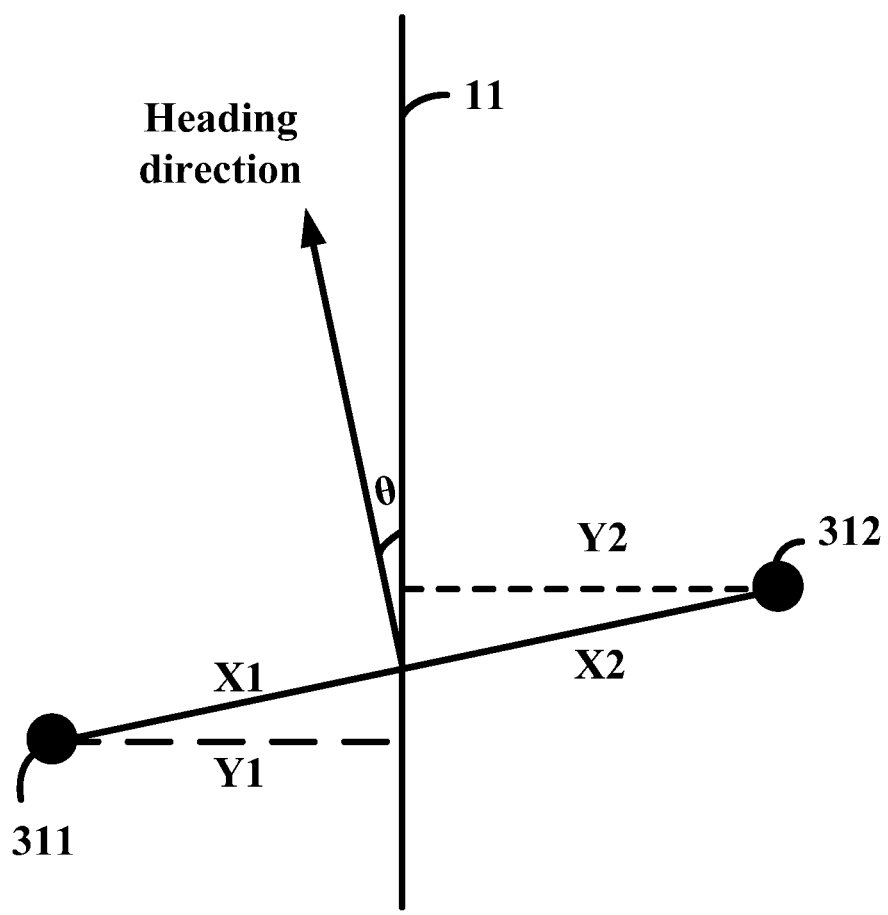
FIG. 18 is a diagram showing the principle for calculating related parameters of the attitude of the smart mower relative to the boundary line 11 according to the example shown in FIG. 16.

Referring to FIG. 18, the intersection O of a straight line in which the first signal receiving module 311 and the second signal receiving module 312 are located and the boundary line is defined as a first intersection. The control module is configured to calculate a first distance X1 of the first signal receiving module 311 and the first intersection O based on the first vertical distance Y1 and the included angle θ; calculate a second distance X2 of the second signal receiving module 312 and the first intersection O based on the second vertical distance Y2 and the included angle θ; and control the smart mower to walk along the boundary line 11 according to the first distance X1 and the second distance X2. Thus, based on the above information, that is, the preset distance D between the first signal receiving module 311 and the second signal receiving module 312, the vertical distance Y1 between the first signal receiving module 311 and the boundary line 11 and the vertical distance Y2 between the second signal receiving module 312 and the boundary line 11, the control module 33 can calculate the included angle θ between the heading direction of the smart mower 30 and the boundary line 11, the first distance X1 between the first signal receiving module 311 and the first intersection O and the second distance X2 between the second signal receiving module 312 and the first intersection O.

According to the formulas $\theta = \arccos Y1 \pm Y2/D$, $X1 = Y1/\cos \theta$, and $X2 = Y2/\cos \theta$, the control module 33 can obtain the included angle θ between the heading direction of the smart mower 30 and the boundary line 11, the distance X1 between the first signal receiving module 311 along the straight line where the first signal receiving module 311 and the second signal receiving module 312 are located and the boundary line and the distance X2 between the second signal receiving module 312 along the straight line where the first signal receiving module 311 and the second signal receiving module 312 are located and the boundary line. When the smart mower 30 walks along the boundary line 11 and the heading direction of the smart mower 30 is the same as the boundary line 11, the control module 33 calculates and obtains that the included angle θ between the heading direction of the smart mower 20 and the boundary line 11 is 0°, and that the first boundary line induction signal FMS' of the first signal receiving module is opposite in phase to the second boundary line induction signal SMS' generated by the second signal receiving module. Therefore, one signal receiving module is located in the working area inside the boundary line 11, and one is located outside the working area of the boundary line 11. When the included angle θ between the heading direction of the smart mower 30 and the boundary line 11 is not 0°, the intensity of the first boundary line induction signal FMS' generated by the first signal receiving module 311 is less than the intensity of the second boundary line induction signal SMS' generated by the second signal receiving module 312. Moreover, the first boundary line induction signal FMS' generated by the first signal receiving module 311 is opposite in phase to the second boundary line induction signal SMS' generated by the second signal receiving module 312. According to the preceding formulas, the control module 33 can calculate the related parameters of the attitude of the smart mower 30 relative to the boundary line 11 to give a control signal to control the smart mower 30 to walk basically along the boundary line.

Thus, the controller calculates the related parameters of the attitude of the smart mower 20 relative to the boundary line 11 based on the amplitudes and phases of the first boundary line induction signal FMS' of the first signal receiving module 311 and the second boundary line induction signal SMS' of the second signal receiving module 312 and gives a control signal to control the smart mower 20 to walk basically along the boundary line 11. Here, the boundary line 11 may be a preset route.

In some examples, when the working area or part of the working area inside the boundary line 11 is narrower, and the boundary line 11 forms a narrow passage, the controller may determine the related parameters of the attitude of the smart mower 30 relative to the boundary line 11 and adjust the heading direction of the smart mower 30 to pass through the area of the narrow passage through the preceding method.

Figure 19:
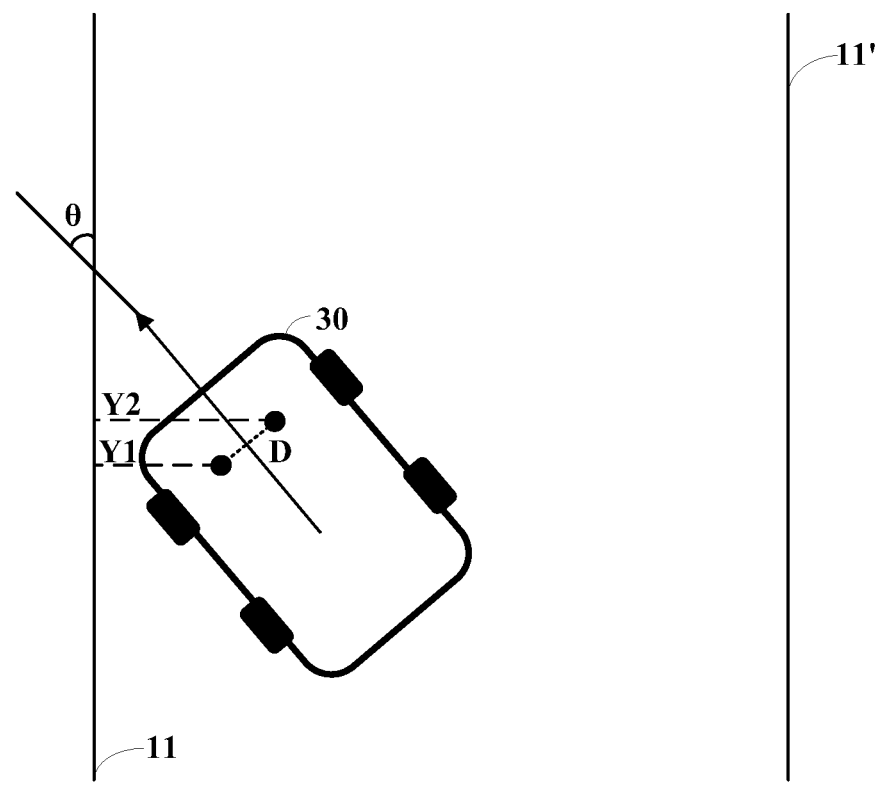
FIG. 19 is a diagram showing the principle for calculating related parameters of the attitude of the smart mower relative to the boundary line 11 in a narrow passage according to the example shown in FIG. 16.

Referring to FIG. 19, the boundary line includes a first boundary line 11 and a second boundary line 11' adjacent to the first boundary line. A walk passage is defined between the first boundary line 11 and the second boundary line 11'.

Figure 20:
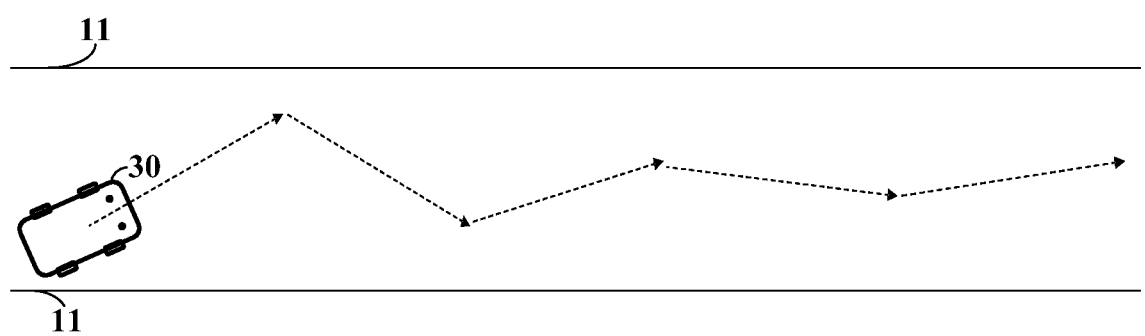
FIG. 20 is a view of the smart mower walking through a narrow passage according to the example shown in FIG. 16.

There is a preset distance D between the first signal receiving module 311 and the second signal receiving module 312. The control module 33 may determine the vertical distance Y1 between the first signal receiving module and the boundary line 11 and the vertical distance Y2 between the second signal receiving module and the boundary line 11 according to the signal intensity of the first boundary line induction signal FMS' and the signal intensity of the second boundary line induction signal SMS', respectively. According to the preceding formulas, the controller may calculate the included angle θ between the heading direction of the smart mower 30 and the boundary line 11, the first distance X1 between the first signal receiving module 311 and the first intersection O and the second distance X2 between the second signal receiving module 312 and the second intersection O according to the first boundary line induction signal FMS', the second boundary line induction signal SMS' and the preset distance D. Thus, according to the preceding related parameters of the attitude of the smart mower 30 relative to the boundary line 11, the smart mower is controlled to pass through the walk passage when at least one of the first signal receiving module or the second signal receiving module is located inside the boundary line. As shown in FIG. 20, the smart mower 30 continuously decreases the included angle θ between the heading direction and the boundary line 11 while passing through the area of the narrow passage. In this manner, the smart mower is more efficient when passing through the narrow passage.

What is claimed is:

1. A smart mowing system, comprising:
   a smart mower;
   a boundary line defining at least a part of a working area of the smart mower; and
   a signal transmitting unit electrically connected to the boundary line and configured to generate a boundary signal and transmit the boundary signal to the boundary line, wherein a magnetic field is generated when the boundary signal flows through the boundary line,
   wherein the smart mower comprises:
      a first signal receiving module configured to generate a first boundary line induction signal by inducing a change of the magnetic field generated by the boundary signal;
      a second signal receiving module configured to generate a second boundary line induction signal by inducing a change of the magnetic field generated by the boundary signal, wherein the second signal receiving module is a preset distance away from the first signal receiving module; and
      a control module configured to:
         receive the first boundary line induction signal and the second boundary line induction signal;
         determine whether the first signal receiving module is located inside the boundary line according to at least the first boundary line induction signal;
         determine whether the second signal receiving module is located inside the boundary line according to at least the second boundary line induction signal; and
         when at least one of the first signal receiving module or the second signal receiving module is located outside the boundary line, control the smart mower to walk basically along the boundary line,
         acquire a phase of the first boundary line induction signal, and
         determine that the first signal receiving module is located in the working area when a value range of the phase of the first boundary line induction signal is greater than or equal to −90° and less than 90°.

2. The smart mowing system according to claim 1, wherein the boundary signal comprises a transmit signal segment and a vacant signal segment which occur alternately and the transmit signal segment is a first sine wave with a first phase.

3. The smart mowing system according to claim 2, wherein the control module is configured to determine whether the first signal receiving module is located inside the boundary line at least according to a voltage peak value VH1 and a voltage valley value VL1 of the first boundary line induction signal in a current period and a voltage peak value VH2 and a voltage valley value VL2 of the first boundary line induction signal in a previous period.

4. The smart mowing system according to claim 3, wherein the first boundary line induction signal comprises a first signal segment and a second signal segment and, when the voltage peak value VH1 is less than the voltage peak value VH2 when the first boundary line induction signal is the first signal segment, the first signal receiving module is determined to be located in the working area.

5. The smart mowing system according to claim 2, wherein a voltage peak value SH2 and a voltage valley value SL2 of the second boundary line induction signal in a current period and a voltage peak value SH1 and a voltage valley value SL1 of the second boundary line induction signal in a previous period are acquired to determine whether the second signal receiving module is located inside the boundary line.

6. The smart mowing system according to claim 5, wherein the second boundary line induction signal comprises a first signal segment and a second signal segment and, when the voltage peak value SH1 is less than the voltage peak value SH2 when the second boundary line induction signal is the first signal segment, the second signal receiving module is determined to be located in the working area.

7. The smart mowing system according to claim 1, wherein the boundary signal comprises a transmit signal segment and an inhibit signal segment which occur alternately, the transmit signal segment is a first sine wave with a first phase, the inhibit signal segment is a second sine wave of a second phase, and the second phase is opposite to the first phase.

8. The smart mowing system according to claim 7, wherein a voltage peak value VH1 and a voltage valley value VL1 of the first boundary line induction signal in a current period and a voltage peak value VH2 and a voltage peak value VL2 of the first boundary line induction signal in a previous period are acquired to determine whether the first signal receiving module is located inside the boundary line.

9. The smart mowing system according to claim 8, wherein the first boundary line induction signal comprises a first signal segment and a second signal segment and, when the voltage peak value VH1 is greater than the voltage peak value VH2 when the first boundary line induction signal is the first signal segment, the first signal receiving module is determined to be located in the working area.

10. The smart mowing system according to claim 7, wherein a voltage peak value SH2 and a voltage valley value SL2 of the second boundary line induction signal in a current period and a voltage peak value SH1 and a voltage valley value SL1 of the second boundary line induction signal in a previous period are acquired to determine whether the second signal receiving module is located inside the boundary line.

11. The smart mowing system according to claim 10, wherein the second boundary line induction signal comprises a first signal segment and a second signal segment and, when the voltage peak value SH1 is greater than the voltage peak value SH2 when the second boundary line induction signal is the first signal segment, the second signal receiving module is determined to be located in the working area.

12. The smart mowing system according to claim 1, wherein the control module is configured to: acquire a phase of the first boundary line induction signal by multiplying the first boundary line induction signal by a first preset function.

13. The smart mowing system according to claim 1, wherein
the control module is configured to:
acquire a phase of the second boundary line induction signal; and
determine that the second signal receiving module is located in the working area when a value range of the phase of the second boundary line induction signal is greater than or equal to −90° and less than 90°.

14. The smart mowing system according to claim 1, wherein
the control module is configured to:
acquire a phase of the second boundary line induction signal by multiplying the second boundary line induction signal by a first preset function; and
determine that the second signal receiving module is located in the working area when a value range of the phase of the second boundary line induction signal is greater than or equal to −90° and less than 90°.

15. The smart mowing system according to claim 1, wherein the control module is configured to:
when at least one of the first signal receiving module or the second signal receiving module is located outside the boundary line, acquire an attitude of the smart mower relative to the boundary line and control the smart mower to walk basically along the boundary line according to the attitude of the smart mower relative to the boundary line.

16. The smart mowing system according to claim 15, wherein the attitude of the smart mower relative to the boundary line comprises an included angle between a heading direction of the smart mower and the boundary line and at least one of a first vertical distance Y1 between the first signal receiving module and the boundary line or a second vertical distance Y2 between the second signal receiving module and the boundary line.

17. The smart mowing system according to claim 16, wherein
the control module is further configured to:
calculate the first vertical distance between the first signal receiving module and the boundary line based on an amplitude of the first boundary line induction signal;
calculate the second vertical distance between the second signal receiving module and the boundary line based on an amplitude of the second boundary line induction signal; and
calculate the included angle between the heading direction of the smart mower and the boundary line based on the first vertical distance Y1, the second vertical distance Y2 and the preset distance.

18. The smart mowing system according to claim 17, wherein
an intersection of a straight line in which the first signal receiving module and the second signal receiving module are located and the boundary line is defined as a first intersection; and
the control module is further configured to:
calculate a first distance between the first signal receiving module and the first intersection based on the first vertical distance and the included angle;
calculate a second distance between the second signal receiving module and the first intersection based on the second vertical distance and the included angle; and control the smart mower to walk basically along the boundary line according to the first distance and the second distance.

19. A smart mowing system, comprising:

a smart mower;

a boundary line comprising a first boundary line and a second boundary line adjacent to the first boundary line, wherein a walk passage is defined between the first boundary line and the second boundary line; and a signal transmitting unit electrically connected to the boundary line and configured to generate a boundary signal and transmit the boundary signal to the boundary line, wherein a magnetic field is generated when the boundary signal flows through the boundary line;

wherein the smart mower comprises:

a first signal receiving module configured to generate a first boundary line induction signal by inducing a change of the magnetic field generated by the boundary signal;

a second signal receiving module configured to generate a second boundary line induction signal by inducing a change of the magnetic field generated by the boundary signal, wherein the second signal receiving module is a preset distance away from the first signal receiving module; and a control module configured to:

receive the first boundary line induction signal and the second boundary line induction signal;

determine whether the first signal receiving module is located inside the boundary line according to at least the first boundary line induction signal;

determine whether the second signal receiving module is located inside the boundary line according to at least the second boundary line induction signal; and when at least one of the first signal receiving module or the second signal receiving module is located inside the boundary line, control the smart mower to pass through the walk passage, and wherein an attitude of the smart mower relative to the boundary line comprises an included angle between a heading direction of the smart mower and the boundary line and at least one of a first vertical distance Y1 between the first signal receiving module and the boundary line or a second vertical distance Y2 between the second signal receiving module and the boundary line.

* * * * *